United States Patent
Davey et al.

(10) Patent No.: US 11,650,087 B2
(45) Date of Patent: May 16, 2023

(54) ULTRASONIC METER INCLUDING ONE OR MORE PAIRS OF ULTRASONIC TRANSDUCERS AND TWO OR MORE PROTRUSIONS ARRANGED TO EXCLUDE FLUID FROM NON-SAMPLED VOLUME

(71) Applicant: SENTEC LTD, Cambridge (GB)

(72) Inventors: Ben Davey, Cambridge (GB); Charlie Paterson, Comberton (GB)

(73) Assignee: SENTEC LTD., Cambridge (GB)

( * ) Notice: Subject to any disclaimer, the term of this patent is extended or adjusted under 35 U.S.C. 154(b) by 235 days.

(21) Appl. No.: 17/054,311

(22) PCT Filed: Mar. 13, 2019

(86) PCT No.: PCT/GB2019/050708
§ 371 (c)(1),
(2) Date: Nov. 10, 2020

(87) PCT Pub. No.: WO2019/229409
PCT Pub. Date: Dec. 5, 2019

(65) Prior Publication Data
US 2021/0080302 A1   Mar. 18, 2021

(30) Foreign Application Priority Data

May 31, 2018   (GB) .................................... 1808918

(51) Int. Cl.
G01F 1/66    (2022.01)
G01F 1/667   (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| | | | |
|---|---|---|---|
| 4,103,551 A * | 8/1978 | Lynnworth | G01F 1/662 73/861.31 |
| 6,748,811 B1 * | 6/2004 | Iwanaga | G01F 1/662 73/861.27 |

(Continued)

FOREIGN PATENT DOCUMENTS

| | | | | |
|---|---|---|---|---|
| CN | 101688800 A * | 3/2010 | | G01F 1/662 |
| EP | 0559938 B1 | 3/1992 | | |

(Continued)

OTHER PUBLICATIONS

International Search Report and Written Opinion from related international application PCT/GB2019/050708, dated May 31, 2019, all pages cited in its entirety.

(Continued)

*Primary Examiner* — Harshad R Patel
(74) *Attorney, Agent, or Firm* — Burr & Forman LLP

(57) ABSTRACT

An ultrasonic meter (28) for measuring a flow-rate of a fluid is described. The ultrasonic meter (28) includes a flow conduit (5) for the fluid. The flow conduit (5) extends along a first axis (6) between a first opening (7) and a second opening (8). The ultrasonic meter (28) also includes one or more pairs of ultrasonic transducers (2, 3). Each pair of ultrasonic transducers (2, 3) is configured to define a corresponding beam path (9) intersecting the flow conduit (5) within a measurement region (12) of the flow conduit (5). The measurement region (12) spans between a first position ($z_1$) and a second position ($z_2$) spaced apart along the first axis (6). One or more portions of the measurement region (12) which are outside of any of the one or more beam paths (9) correspond to non-sampled volumes (12b). The ultrasonic meter (28) also includes one or more protrusions (34) extending along the first axis (6). At least part of each (Continued)

protrusion (34) is arranged to exclude fluid from at least part of one or more non-sampled volumes (12*b*).

20 Claims, 18 Drawing Sheets

(56) References Cited

U.S. PATENT DOCUMENTS

| | | | |
|---|---|---|---|
| 9,182,260 | B2 | 11/2015 | Nielsen et al. |
| 10,107,660 | B2 | 10/2018 | Drachmann |
| 10,895,479 | B2 * | 1/2021 | Papathanasiou ........ G01F 1/667 |
| 2011/0238333 | A1 | 9/2011 | Miyata et al. |
| 2017/0211956 | A1 | 7/2017 | Drachmann |
| 2018/0120139 | A1 | 5/2018 | Sonnenberg |
| 2018/0136024 | A1 | 5/2018 | Sonnenberg |
| 2018/0010940 | A1 | 7/2018 | Sonnenberg |

FOREIGN PATENT DOCUMENTS

| | | |
|---|---|---|
| EP | 1775560 A2 | 4/2007 |
| EP | 2725327 A1 | 4/2014 |
| EP | 3566027 A1 | 11/2019 |
| EP | 3677877 A1 | 7/2020 |
| WO | 2014051643 A1 | 4/2014 |

OTHER PUBLICATIONS

Examination Report from related Indian Application No. 202017050098, dated Sep. 12, 2022, all pages cited in its entirety.

Office Action issued in corresponding Israeli Application No. 279043 dated Nov. 15, 2022, all pages cited herein.

Communication Pursuant to Article 94(3) EPC issued in corresponding European Application No. 19713146.9 dated Nov. 2, 2022, all pages cited herein.

* cited by examiner

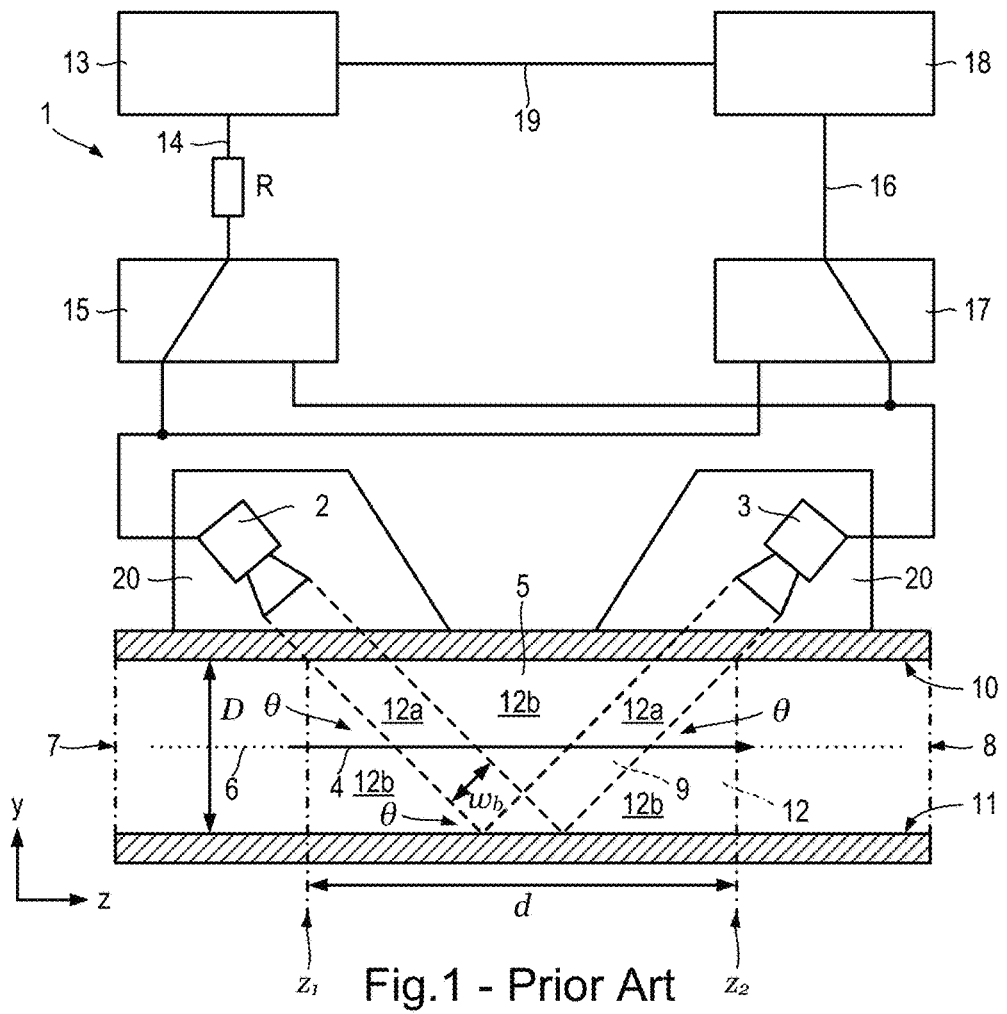
Fig.1 - Prior Art
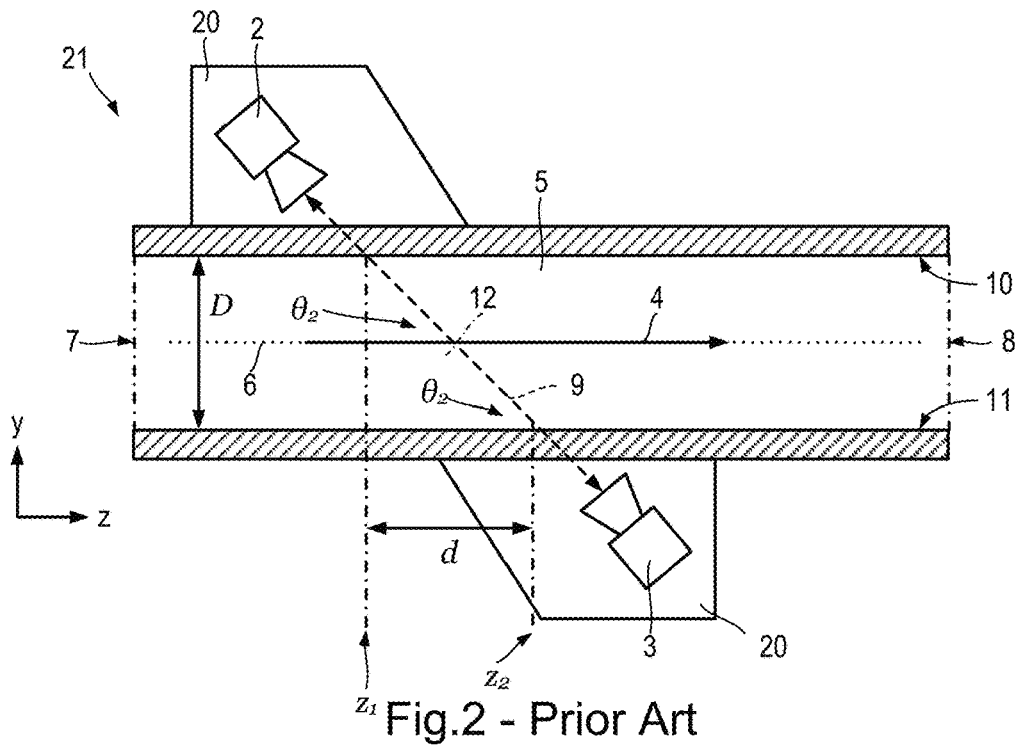
Fig.2 - Prior Art

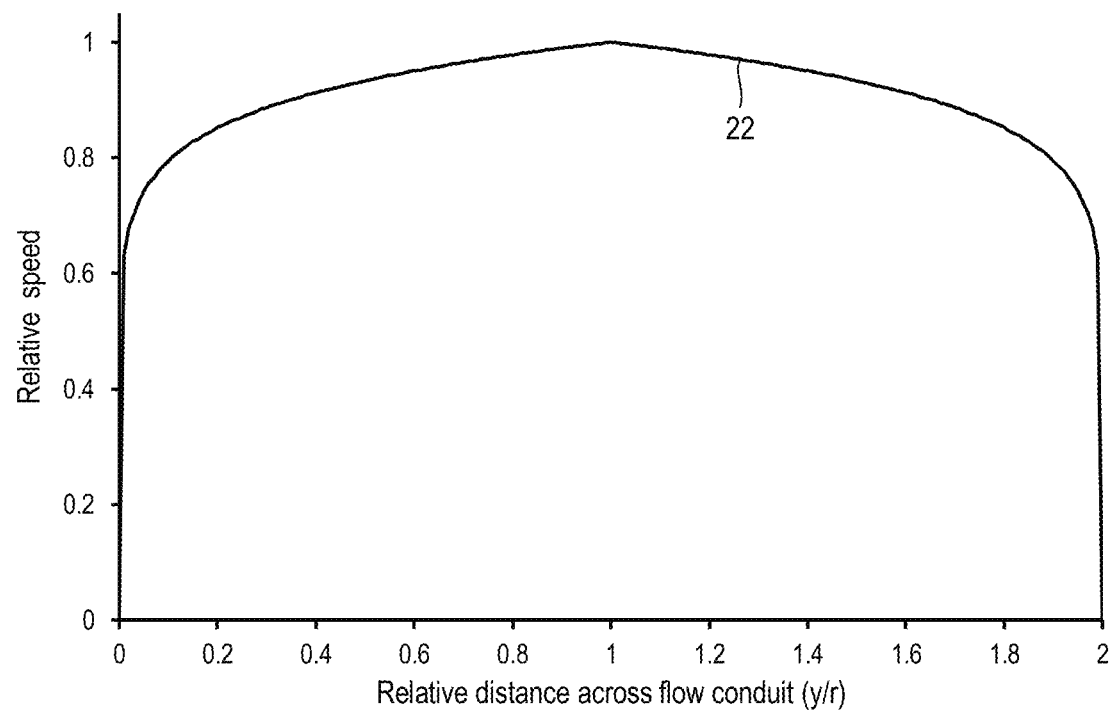
Fig.3 - Prior Art
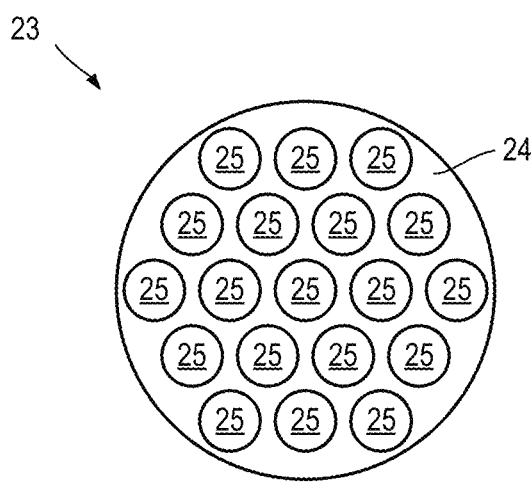
Fig.4 - Prior Art

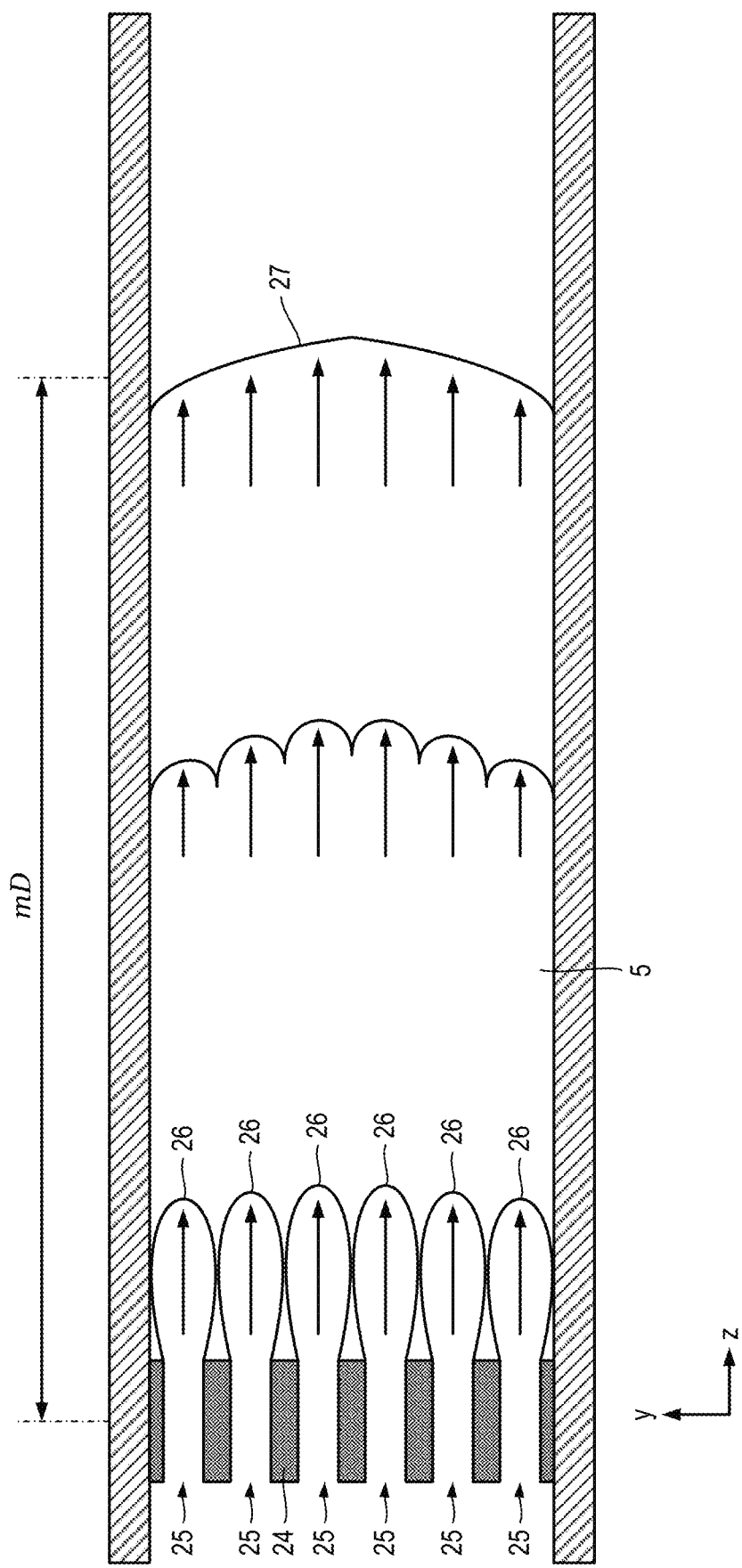
Fig.5 - Prior Art

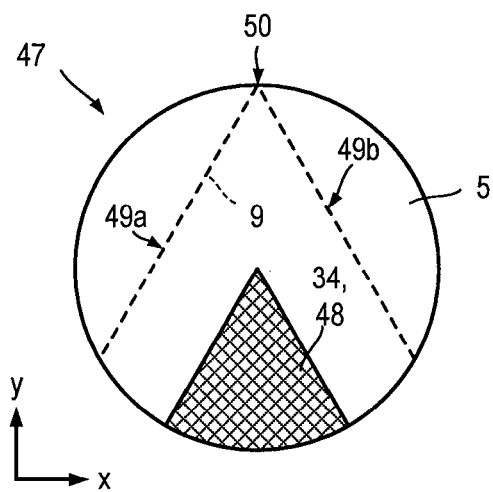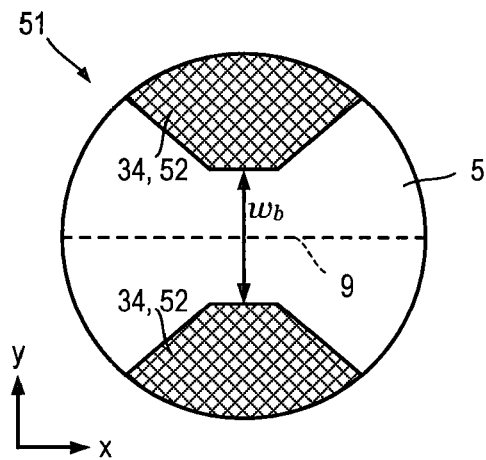
Fig.12  Fig.13A
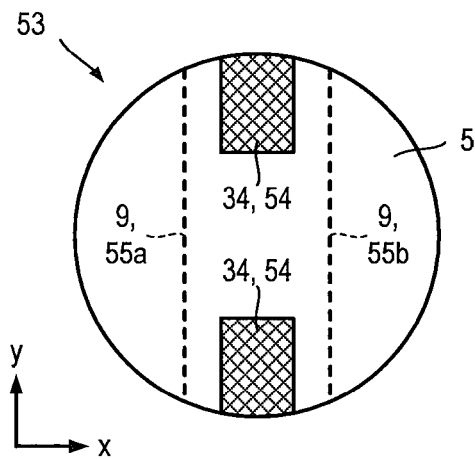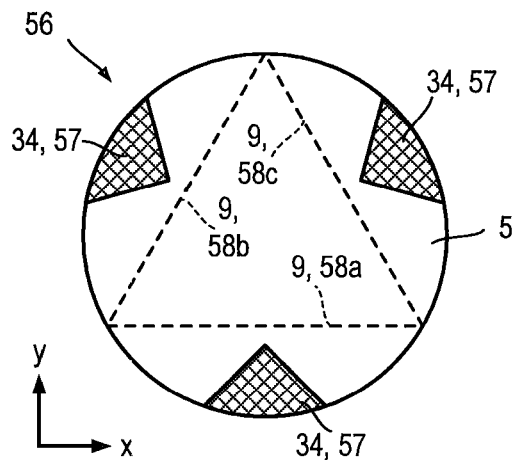
Fig.13B  Fig.14
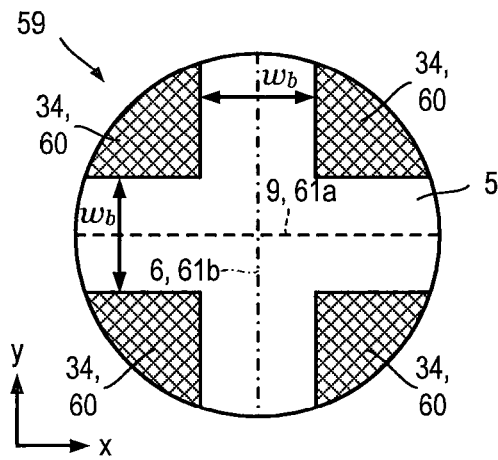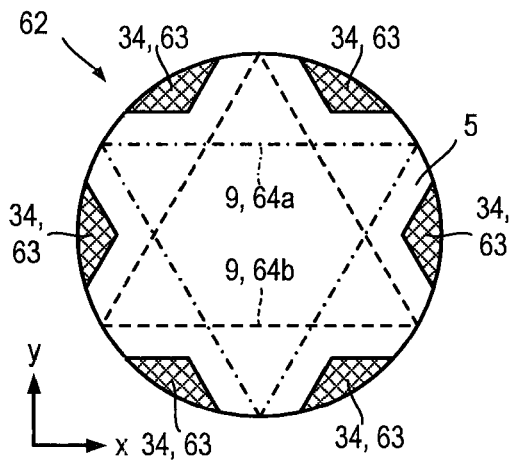
Fig.15  Fig.16

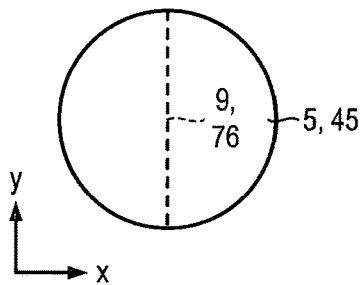 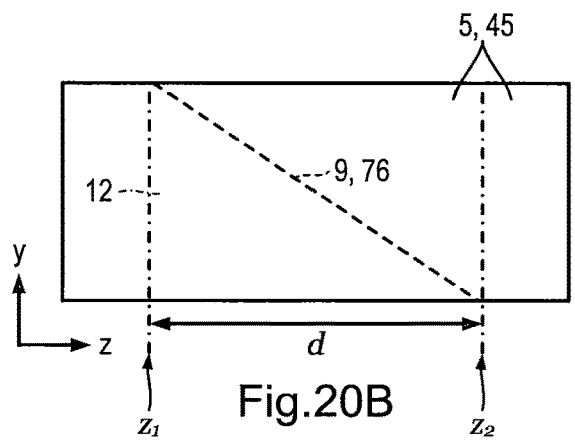
Fig.20A    Fig.20B
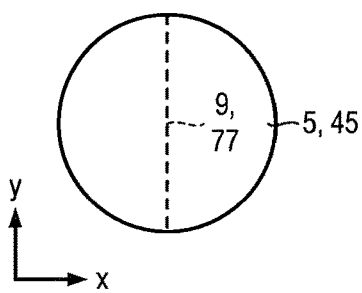 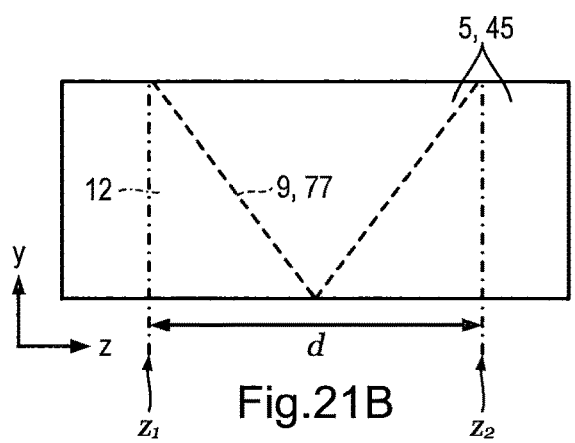
Fig.21A    Fig.21B
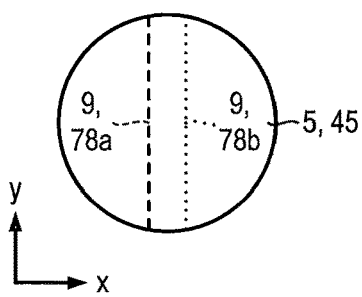 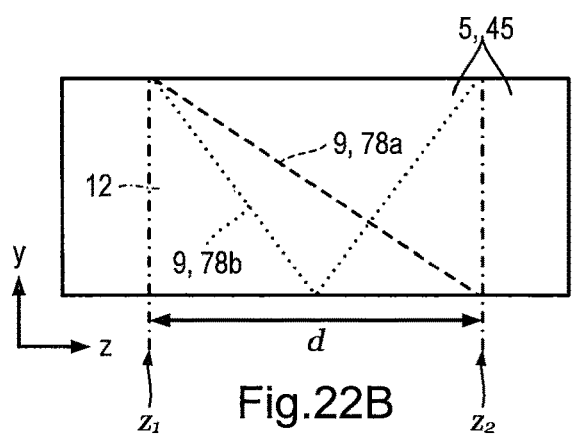
Fig.22A    Fig.22B
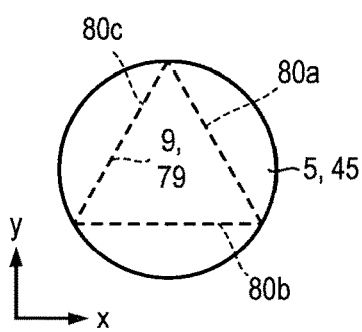 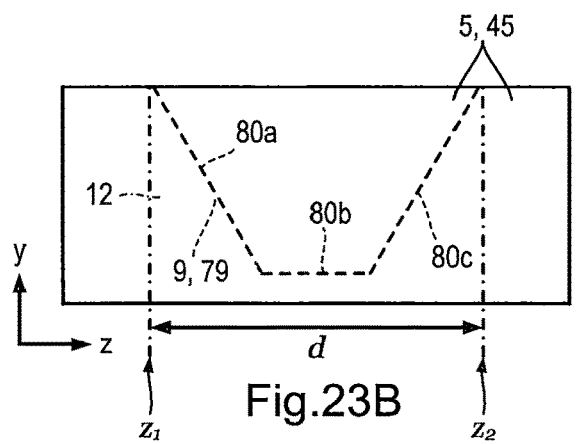
Fig.23A    Fig.23B

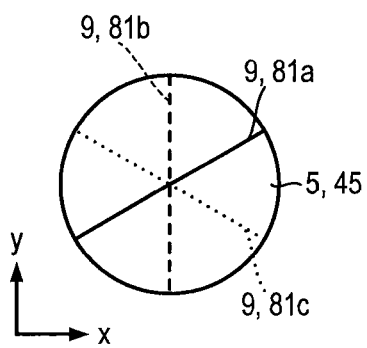 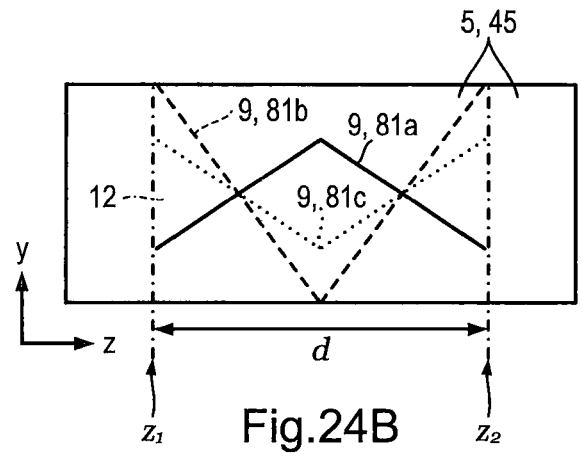
Fig.24A  Fig.24B
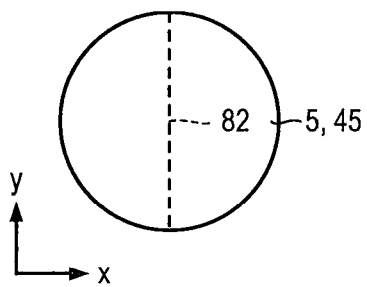 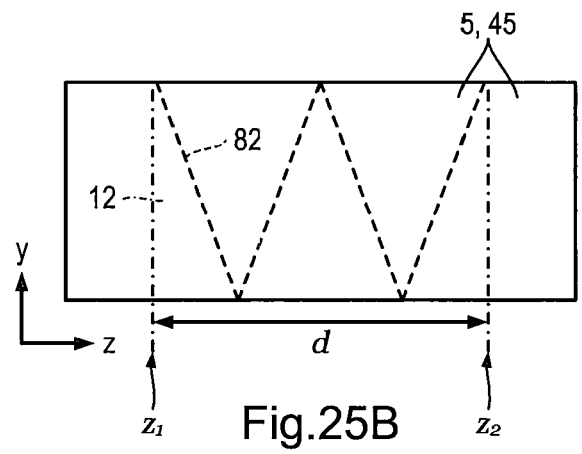
Fig.25A  Fig.25B
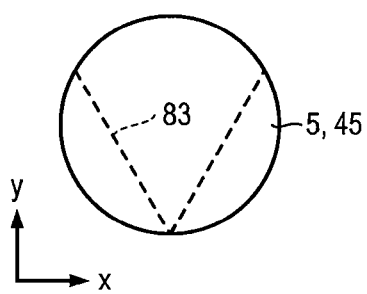 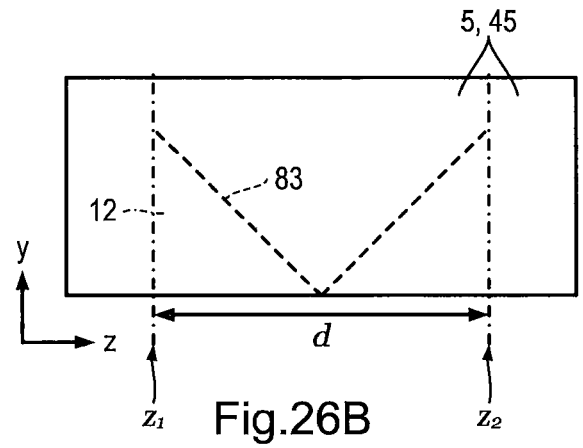
Fig.26A  Fig.26B

ULTRASONIC METER INCLUDING ONE OR MORE PAIRS OF ULTRASONIC TRANSDUCERS AND TWO OR MORE PROTRUSIONS ARRANGED TO EXCLUDE FLUID FROM NON-SAMPLED VOLUME

FIELD OF THE INVENTION

The present invention relates to ultrasonic flow rate meters.

BACKGROUND

Ultrasonic flow rate meters have been constructed which measure a flow velocity of a liquid or gas based on time-of-flight measurements. Sometimes a pair of ultrasonic transducers is arranged at opposite ends of a flow tube having a known length. Alternatively, a pair of ultrasonic transducers may be arranged spaced apart along the length of a flow tube by a distance, the ultrasonic transducers arranged at angles to the flow tube such that ultrasound may pass between the pair by reflecting from an internal wall or reflector of the flow tube. By obtaining time-of-flight measurements between the ultrasonic transducers both with, and against, the flow direction of the liquid or gas, a difference may be obtained which relates to the flow speed of the liquid or gas.

Only a fraction of the liquid or gas (hereinafter both shall be encompassed by the term "fluid") passes through the ultrasonic beam. Consequently, the flow speed measured represents an average over the volume sampled by the ultrasonic beam. In order to convert such an average flow speed to a mass flow of the fluid, for example to allow metering of the fluid, a velocity profile of the fluid must be assumed. When a fluid flows down a straight section of pipe with uniform cross-section, the velocity profile across the pipe will tend towards a predictable profile after flowing for a sufficiently large distance. Thus, when an ultrasonic meter is installed in, or on, a long straight section of pipe, the approach of assuming a velocity profile may work reasonably well. However, features such as bends, constrictions, valves, pumps and so forth upstream of an ultrasonic meter may cause the velocity profile in a pipe to deviate from the expected profile, reducing the accuracy of the ultrasonic meter. Since a sufficiently long, straight section of pipe may not be available, the accuracy and/or possible installation locations of ultrasonic flow meters may be restricted One approach for improving the predictability of a velocity profile is to place one or more flow conditioners upstream (and sometimes also downstream) of an ultrasonic meter. For example, EP 1775 560 A2 describes an ultrasonic flow meter including a flow passage, an ultrasound transducer and a flow straightener for removing or diminishing flow disturbances such as swirls. The flow straightener includes at least a first and a second straightening means being oppositely twisted along a flow direction with a given twisting angle. "*Flow conditioning and effects on accuracy for fluid flow measurement*", B. D. Sawchuck, D. P. Sawchuck, D. A. Sawchuk, American School of Gas Measurement Technology, 2010, p 1-9, describes the results of testing a flow conditioner.

SUMMARY

According to a first aspect of the invention, there is provided an ultrasonic meter for measuring a flow-rate of a fluid. The ultrasonic meter includes a flow conduit for the fluid. The flow conduit extends along a first axis between a first opening and a second opening. The ultrasonic meter also includes one or more pairs of ultrasonic transducers. Each pair of ultrasonic transducers is configured to define a corresponding beam path intersecting the flow conduit within a measurement region of the flow conduit. The measurement region spans between a first position and a second position spaced apart along the first axis. One or more portions of the measurement region which are outside of any of the one or more beam paths correspond to non-sampled volumes. The ultrasonic meter also includes one or more protrusions extending along the first axis. At least part of each protrusion is arranged to exclude fluid from at least part of one or more non-sampled volumes.

Each beam path may have a component parallel to the first axis. Each beam path may have a component transverse to the first axis. In some examples, one or more beam path(s) may be not parallel to the flow axis. The measurement region may correspond to a volume which is bounded by the first position, the second position and one or more interior surfaces of the flow conduit.

Each protrusion may be configured to re-direct a fluid flow out of at least part of one or more non-sampled volumes and through the one or more beam paths. Each protrusion may be configured to increase a mass fraction of the fluid which intersects the one or more beam paths. Intersecting a beam path may mean passing through that beam path. The mass fraction may be increased with respect to an ultrasonic meter which is same except that the one or more protrusions are omitted. A mass fraction of the fluid which intersects the one or more beam paths may be defined as a mass of fluid which passes through the one of more beam paths in unit time, divided by a mass of fluid which enters (or leaves) the flow conduit via the first opening (or second opening) in unit time. Each protrusion may extend into the flow conduit perpendicular to the first axis.

The flow conduit may be configured such that an average flow vector of fluid passing through the flow conduit remains substantially parallel to the first axis throughout the measurement region. Substantially parallel may mean within ±5 degrees of the first axis, or within ±10 degrees of the first axis. An average flow vector may be calculated for each point along the first axis by averaging a vector field corresponding to the fluid velocity across a cross-section of the flow conduit perpendicular to the first axis.

The one or more pairs of ultrasonic transducers may be arranged outside the flow conduit. The first opening may be connected to a first inlet/outlet for fluid by a first conduit. The first conduit may follow a straight path between the first opening and the first inlet/outlet. The first conduit may follow a curving and/or branching path between the first opening and the first inlet/outlet. The first conduit may be part of the ultrasonic meter. The first conduit may be separate from the ultrasonic meter. The second opening may be connected to a second inlet/outlet for fluid by a second conduit. The second conduit may follow a straight path between the second opening and the second inlet/outlet. The first conduit may follow a curving and/or branching path between the second opening and the second inlet/outlet. The second conduit may be part of the ultrasonic meter. The second conduit may be separate from the ultrasonic meter.

At least one protrusion may extend along the first axis for a distance which spans the measurement region.

Each protrusion may extend along the first axis for a distance which spans the measurement region. At least one protrusion may extend parallel to the first axis. Each protrusion may extend parallel to the first axis. At least one protrusion may extend along the first axis without being parallel to the first axis. Each protrusion may extend along the first axis without being parallel to the first axis.

Fluid moving along the flow conduit from the first opening towards the second opening may encounter at least one protrusion before entering the measurement region. Fluid moving along the flow conduit from the first opening towards the second opening may encounter each protrusion before entering the measurement region. Fluid moving along the flow conduit from the second opening towards the first opening may encounter at least one protrusion before entering the measurement region. Fluid moving along the flow conduit from the second opening towards the first opening may encounter each protrusion before entering the measurement region.

Distance parallel to the first axis may be parameterised by a coordinate z and the measurement region may span between the first position $z_1$ and the second position $z_2$.

At least one protrusion may extend between a first coordinate $z_a$ less than or equal to $z_1$ and a second coordinate $z_b$ greater than or equal to $z_2$. Each protrusion may extend between a first coordinate $z_a$ less than or equal to $z_1$ and a second coordinate $z_b$ greater than or equal to $z_2$.

For at least one protrusion, a cross-sectional area of the protrusion perpendicular to the first axis may vary with position along the first axis. A cross-sectional area of each protrusion perpendicular to the first axis may vary with position along the first axis.

For at least one protrusion, a cross-sectional shape of the protrusion in a plane perpendicular to the first axis may vary with position along the first axis. A cross-sectional shape of each protrusion in a plane perpendicular to the first axis may vary with position along the first axis.

For at least one protrusion, a height of the protrusion perpendicular to the first axis may vary with position along the first axis. The height of a protrusion may be a distance which each protrusion extends from an outer surface of the flow conduit towards a centroid of the flow conduit. A height of each protrusion perpendicular to the first axis may vary with position along the first axis.

At least one protrusion may be symmetric about a midpoint of the measurement region. At least one protrusion may be symmetric about a plane perpendicular to the first direction and positioned halfway between the first and second positions. Each protrusion may be symmetric about a midpoint of the measurement region. Each protrusion may be symmetric about a plane perpendicular to the first direction and positioned halfway between the first and second positions.

At least one protrusion may be asymmetric about a midpoint of the measurement region. At least one protrusion may be asymmetric about a plane perpendicular to the first direction and positioned halfway between the first and second positions. Each protrusion may be asymmetric about a midpoint of the measurement region. Each protrusion may be asymmetric about a plane perpendicular to the first direction and positioned halfway between the first and second positions.

The one or more protrusions may be integrally formed with the flow conduit.

When protrusions are integrally formed with the flow conduit, a mass fraction intersecting the one or more beam paths may be increased with respect to an ultrasonic meter including a flow conduit which is same except that the one or more protrusions are omitted.

An insert may be secured within the flow conduit. The insert may define a through passage including at least one of the one or more protrusions.

The through passage may include all of the one or more protrusions. The cross-sectional area of the through passage perpendicular to the first axis may be less than the cross-sectional area of the flow conduit perpendicular to the first axis. The insert may be formed as a single piece. The insert may be formed from two or more pieces joined together. When the protrusions are defined by an insert, a mass fraction intersecting the one or more beam paths may be increased with respect to an ultrasonic meter including an insert which is same except that the one or more protrusions are omitted.

The insert may be configured to provide a secondary flow path between the insert and the walls of the flow conduit. The secondary flow path may be configured such that, in use, a first mass fraction of fluid passing via the through passage may be greater than a second mass fraction of fluid passing via the secondary flow path.

The secondary flow path may be configured to prevent fluid from stagnating in a space between the insert and an inner surface of the flow conduit when the ultrasonic meter is in use. The secondary flow path may be configured to relieve a pressure differential on portions of the insert defining the one or more protrusions when the ultrasonic meter is in use. A mass fraction of fluid passing though the secondary flow path may be less than 1%.

At least one beam path may include at least one reflection.

At least one beam path may include at least one reflection from a reflection plate. The reflection plate may include, or be formed from, a metal. At least one beam path may include at least one reflection from a surface of an insert defining the protrusions. At least one beam path may include at least one reflection from an internal surface of the flow conduit. Each beam path may include at least one reflection. Each beam path may include at least one reflection from a reflection plate. Each beam path may include at least one reflection from a surface of an insert defining the protrusions. Each beam path may include at least one reflection from an internal surface of the flow conduit.

For at least one protrusion, a cross-sectional area of the protrusion in a plane perpendicular to the first axis may increase in a direction along the first axis from the first opening to the first position.

The at least one protrusion may have zero cross-sectional area at the first opening. A cross-sectional area of each protrusion in a plane perpendicular to the first axis may increase in a direction along the first axis from the first opening to the first position. Each protrusion may have zero cross-sectional area at the first opening.

For at least one protrusion, a cross-sectional area of the protrusion in a plane perpendicular to the first axis may increase in a direction along the first axis from the second opening to the second position.

The at least one protrusion may have zero cross-sectional area at the second opening. A cross-sectional area of each protrusion in a plane perpendicular to the first axis may increase in a direction along the first axis from the second opening to the second position. Each protrusion may have zero cross-sectional area at the second opening.

Each protrusion may have substantially constant cross-sectional area through the measurement region.

For at least one protrusion, a height of the protrusion perpendicular to the first axis may increase in a direction along the first axis from the first opening to the first position. The height of the at least one protrusion may be zero at the first opening. A height of each protrusion perpendicular to the first axis may increase in a direction along the first axis from the first opening to the first position. A height of each protrusion may be zero at the first opening.

For at least one protrusion, a height of the protrusion perpendicular to the first axis may increase in a direction along the first axis from the second opening to the second position. The height of at the least one protrusion may be zero at the second opening. A height of each protrusion perpendicular to the first axis may increase in a direction along the first axis from the second opening to the second position. A height of each protrusion may be zero at the second opening.

According to a second aspect of the invention, there is provided an insert for a flow conduit of the ultrasonic meter.

According to a third aspect of the invention, there is provided an insert for an ultrasonic flow meter. The ultrasonic meter includes a flow conduit for the fluid. The flow conduit extends along a first axis between a first opening and a second opening. The ultrasonic meter includes one or more pairs of ultrasonic transducers. Each pair of ultrasonic transducers is configured to define a corresponding beam path intersecting the flow conduit within a measurement region of the flow conduit. The measurement region spans between a first position and a second position spaced apart along the first axis. One or more portions of the measurement region which are outside of any of the one or more beam paths correspond to non-sampled volumes. The insert is configured to be securable within the flow conduit so that at least part of the insert is disposed within the measurement region. The insert includes a through passage, the through passage configured to extend along the first axis when the insert is secured within the flow conduit. The insert also includes one or more protrusions extending into the through passage. When the insert is secured within the flow conduit, each protrusion extends along the first axis so that at least part of each protrusion is arranged to exclude fluid from at least part of one or more non-sampled volumes.

The ultrasonic meter and/or the insert may include two or more protrusions, three or more protrusions, four or more protrusions, six of more protrusions, or eight or more protrusions.

A cross-sectional shape of a protrusion in a plane perpendicular to the first axis may be triangular, square, rectangular, gear tooth shaped with or without radii, T-shaped and so forth. A cross-sectional shape of a protrusion in a plane perpendicular to the first axis may be determined based on fluid modelling to optimise a balance between increasing the mass fraction of fluid which intersects the one or more beam paths, whilst minimising a pressure drop across the ultrasonic meter and/or the insert.

One or more protrusions may have a maximum height which is at least 10%, at least 20%, at least 30%, at least 40%, or at least 50% of a maximum dimension of the flow conduit or through passage perpendicular to the first axis.

One or more protrusions may have a maximum cross-sectional area in a plane perpendicular to the first axis which is at least 5%, at least 10%, at least 15%, at least 20%, at least 30%, at least 40% or at least 50% of a maximum cross-sectional area of the flow conduit or through passage in a plane perpendicular to the first axis.

One or more protrusions may conform to a helical path along the length of the first axis. Each protrusion may conform to a helical path along the length of the first axis.

The ultrasonic meter may include one pair of ultrasonic transducers, two pairs of ultrasonic transducers, or three or more pairs of ultrasonic transducers. The ultrasonic meter may include one, two, three or more reflectors. The reflectors may be configured to be mountable to the flow conduit and/or the insert.

A spacing between adjacent protrusions may be large enough for an ultrasonic transducer and its associated interface components. A spacing between adjacent protrusions may be at least large enough to span an effective beam width of a beam path passing between the adjacent protrusions.

According to a fourth aspect of the invention, there is provided a method of improving an ultrasonic meter for measuring a flow-rate of a fluid. The ultrasonic meter includes a flow conduit for the fluid. The flow conduit extends along a first axis between a first opening and a second opening. The ultrasonic meter also includes one or more pairs of ultrasonic transducers. Each pair of ultrasonic transducers is configured to define a corresponding beam path intersecting the flow conduit within a measurement region of the flow conduit. The measurement region spans between a first position and a second position spaced apart along the first axis. One or more portions of the measurement region which are outside of any of the one or more beam paths correspond to non-sampled volumes. The method includes securing an insert within the flow conduit so that at least part of the insert is disposed within the measurement region. The insert includes a through passage, the through passage configured to extend along the first axis when the insert is secured within the flow conduit. The insert also includes one or more protrusions extending into the through passage. When the insert is secured within the flow conduit, each protrusion extends along the first axis so that at least part of each protrusion is arranged to exclude fluid from at least part of one or more non-sampled volumes.

The insert may be an insert as described in relation to the first, second or third aspects.

The method may include features corresponding to any features defined in relation to the first, second or third aspects of the ultrasonic meter.

According to a fifth aspect of the invention, there is provides a method including using the ultrasonic meter and/or the insert for metering flow of a fluid.

The fluid may be water. Water may be potable water. Water may be waste-water. Water may be drainage run-off.

The fluid may be natural gas.

According to a sixth aspect of the invention, there is provided an ultrasonic meter for measuring a flow-rate of a fluid. The ultrasonic meter includes a flow conduit for the fluid. The flow conduit extends along a first axis between a first opening and a second opening. The flow conduit is configured for insertion into a fluid pipeline such that a bore of the fluid pipeline is aligned with the flow conduit. The ultrasonic meter includes three pairs of ultrasonic transducers. Each pair of ultrasonic transducers is configured to define a corresponding beam path intersecting the flow conduit within a measurement region of the flow conduit. The measurement region spans between a first position and a second position spaced apart along the first axis. One or more portions of the measurement region which are outside of any of the one or more beam paths correspond to non-sampled volumes. Each of the three beam paths has a component parallel to the first axis and a component perpendicular to the first axis. The components of each beam path perpendicular to the first axis are arranged at angles of 0, 120 and 240 degrees with respect to a second axis perpendicular to the first axis. The ultrasonic meter also includes six protrusions, each extending parallel to the first axis and extending into the flow conduit. Each protrusion extends along the first axis for a distance which spans the measurement region. The protrusions passing through the measurement region are arranged around a perimeter of the flow conduit at angles of 30, 90, 150, 210, 270 and 330 degrees with respect to the second axis. At least part of each protrusion is arranged to exclude fluid from at least part of one or more non-sampled volumes.

The protrusions may be integrally formed with the flow conduit. The protrusions may be formed as part of an insert which is secured within the flow conduit. Each beam path may include a reflection from a reflection plate. Each beam path may include a reflection from a surface of the flow conduit or the insert.

The ultrasonic meter may include features corresponding to any features defined in relation to the first to fourth aspects.

According to a seventh aspect of the invention, there is provided an ultrasonic meter for measuring a flow-rate of a fluid. The ultrasonic meter includes a flow conduit for the fluid. The flow conduit extends along a first axis between a first opening and a second opening. The flow conduit is configured for insertion into a fluid pipeline such that a bore of the fluid pipeline is aligned with the flow conduit. The ultrasonic meter includes a pair of ultrasonic transducers configured to define a corresponding beam path intersecting the flow conduit within a measurement region of the flow conduit. The measurement region spans between a first position and a second position spaced apart along the first axis. One or more portions of the measurement region which are outside of any of the one or more beam paths correspond to non-sampled volumes. The beam path has a component parallel to the first axis and a component perpendicular to the first axis. The components of the beam path perpendicular to the first axis correspond to a second axis. The ultrasonic meter also includes six protrusions, each extending parallel to the first axis and extending into the flow conduit. Each protrusion extends along the first axis for a distance which spans the measurement region. The protrusions passing through the measurement region are arranged around a perimeter of the flow conduit at angles of 30, 90, 150, 210, 270 and 330 degrees with respect to the second axis. At least part of each protrusion is arranged to exclude fluid from at least part of one or more non-sampled volumes.

The protrusions may be integrally formed with the flow conduit. The protrusions may be formed as part of an insert which is secured within the flow conduit. The beam path may include a reflection from a reflection plate. The beam path may include a reflection from a surface of the flow conduit or the insert.

The ultrasonic meter may include features corresponding to any features defined in relation to the first to fourth aspects.

BRIEF DESCRIPTION OF THE DRAWINGS

Certain embodiments of the present invention will now be described, by way of example, with reference to the accompanying drawings in which:

FIG. 1 is a schematic cross-section which illustrates an ultrasonic time-of-flight flow rate meter which is useful for understanding the invention;

FIG. 2 is a schematic cross-section which illustrates another ultrasonic time-of-flight flow rate meter which is useful for understanding the invention;

FIG. 3 illustrates a flow speed profile across a flow conduit;

FIG. 4 is a schematic end-on view which illustrates a flow conditioning device;

FIG. 5 is a schematic cross-section which illustrates the effects of a flow conditioning device;

FIGS. 12 to 17 are schematic end-on views which illustrate second to eighth configurations of protrusions for an ultrasonic meter;

FIGS. 20A to 26B illustrate first to seventh beam path types for an ultrasonic meter, schematic cross-sections and end-on views are provided for each beam path type;

DETAILED DESCRIPTION OF CERTAIN EMBODIMENTS

Figure 6:
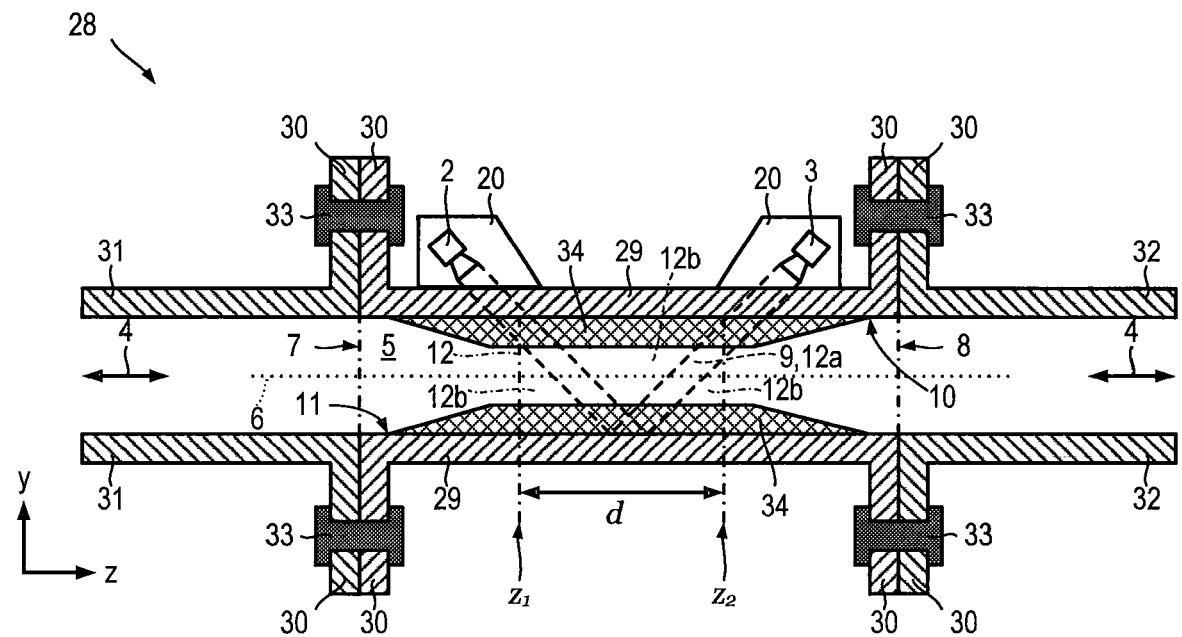
FIG. 6 is a schematic cross-section which illustrates a first ultrasonic meter.

In the following, like parts are denoted by like reference numbers.

Referring to FIG. 1, an ultrasonic meter 1 for measuring a flow-rate of a fluid is shown.

The ultrasonic meter 1 is useful for understanding the present invention. The ultrasonic meter 1 includes a first ultrasonic transducer 2 and a second ultrasonic transducer 3. The first and second ultrasonic transducers 2, 3 are spaced apart along a fluid flow path 4 in the form of a flow conduit 5. The flow conduit 5 extends along a first axis 6 (z-axis in the FIG. 1 example) between a first opening 7 and a second opening 8. The term "flow conduit" encompasses both the volume for fluid flow and also the structure or structures defining that volume. For example, a flow conduit 5 may often take the form of a pipe which encloses a pipe bore through which fluid may flow. However, the flow conduit 5 is not limited to pipes, and may take the form of any structure or structures capable of containing a fluid flow path 4. The first and second transducers 2, 3 are configured to define a beam path 9 between the first and second ultrasonic transducers 2, 3 and having a component in a direction parallel to the first axis 6.

In the example shown in FIG. 1, the first and second ultrasonic transducers 2, 3 are offset from the fluid flow path 4 formed by the flow conduit 5 and oriented at angles ±θ to the first axis 6. Both ultrasonic transducers 2, 3 are arranged spaced apart along the first axis 6 and on a first side 10 of the flow conduit 5. The beam path 9 includes a reflection from a second side 11 of the flow conduit 5, opposed to the first side 10. The flow conduit 5 may include a separate reflector 46 (FIG. 10), or the second side 11 of the flow conduit 5 may be integrally formed to function as a suitable reflector for the beam path 9. The ultrasonic transducers 2, 3 may be piezoelectric transducers, solenoid transducers, and so forth.

The beam path 9 has a finite cross-sectional area, and in general the cross-sectional shape of the beam path 9 will be related to the shapes of the first and second transducers 2, 3. However, an effective area of the beam path 9 will typically represent a fraction of the total transducer 2, 3 area, because the power of the emitted ultrasound may be focused towards the centre of the transducer 2, 3. The relative sensitivity of a transducer 2, 3 used as a receiver is similarly greater towards the centre. Typically, the emitted power/sensitivity varies continuously across a face of a transducer 2, 3. Beam path 9 effective width $w_b$ (or other appropriate dimension) may be defined as the width $w_b$ over which the emitted power/sensitivity remains above a threshold value, for example half of maximum. For example, the transducers 2, 3 may be circular and the beam path 9 may have an effective diameter $w_b$ which is greater than or equal to ⅓ of a diameter of the transducers 2, 3 and less than or equal to said diameter of the transducers 2, 3. In another example the transducers 2, 3 may be square or rectangular, and the beam path 9 may have a square or rectangular cross-section with side length(s) $w_b$ which is (are) greater than or equal to ⅓ of corresponding side lengths of the transducers 2, 3 and less than or equal to said side lengths of the transducers 2, 3. Hereinafter, the effective beam path 9 width $w_b$ (or other dimension) will be referred to rather than the transducer 2, 3 dimensions, because the effective beam path 9 width $w_b$ is more closely related to the volume of fluid which is sampled.

The beam path 9 intersects the flow conduit 5 within a measurement region 12 of the flow conduit. The measurement region 12 is the part of the flow conduit 5 which is sampled by the beam path 9. The measurement region 12 spans between a first position $z_1$ and a second position $z_2$ spaced apart along the first axis 6, and has a length along the flow path 4 of $d=z_2-z_1$. Portions of the measurement region 12 which intersect the effective width $w_b$ (or other dimension) of one or more beam paths 9 may be referred to hereinafter as sampled volumes 12a of the measurement region 12. Portions of the measurement region which are outside the effective width $w_b$ (or other dimension) of any of the beam paths 9 shall be referred to hereinafter as non-sampled volumes 12b of the measurement region 12. As discussed hereinafter, non-sampled volumes 12b of the measurement region 12 do not contribute to determining a calculated flow speed u.

The flow conduit 5 typically has a circular cross-section in a plane perpendicular to the first axis 6, but may have other shapes such as square, rectangular, elliptical and so forth. In ultrasonic meter 1, the flow conduit 5 is cylindrical with diameter D, for example the flow conduit 5 may take the form of a cylindrical pipe. The flow path 4 in FIG. 1 illustrates a fluid flow path 4 from the first opening 7 to the second opening 8. In other examples, the flow path 4 may be directed from the second opening 8 to the first opening 7.

The ultrasonic meter 1 also includes a controller 13, which is configured to drive the first and second ultrasonic transducers 2, 3 alternately. In order to make a measurement of flow rate, the controller 13 may drive the first ultrasonic transducer 2 and measure a first time-of-flight $t_1$ based on reception of the signal at the second ultrasonic transducer 3. The controller 13 then measures a second time of flight $t_2$ by driving the second ultrasonic transducer 3 and receiving the signal at the first ultrasonic transducer 2. If the fluid in the flow conduit 5, which may be a gas or a liquid, is moving from the first opening 7 towards the second opening 8 with a velocity, u, which is typically substantially directed along the first axis 6 then the total velocity of the sound $v_1$ when measuring the first time of flight $t_1$ will be:

$$v_1 = c + u \quad (1)$$

In which c is the velocity of sound in the fluid if the fluid was stationary. Similarly, the total velocity $v_1$ when measuring the second time of flight $t_2$ will be:

$$v_2 = c - u \quad (2)$$

The transit times between the first ultrasonic transducer 2 and the measurement region 12 and between the second ultrasonic transducer 3 and the measurement region 12 are constant, and consequently the difference $\Delta t = t_2 - t_1$ depends on the average velocity u in the flow conduit 5. In this way, the controller 13 may determine the average speed u in the direction of the first axis 6 in the flow conduit 5, and hence estimate a flow rate by assuming the flow is all parallel to the first axis 6. In practice, the ultrasonic meter 1 may be calibrated using at least one, and preferably more, known flow rates of fluid passing through the flow conduit 5.

However, it should be noted that the calculated flow speed u is an average across the fluid which passes through the beam path 9. Any fluid which does not pass through the beam path 9 does not contribute to the measurement of the average speed u. In other words, fluid passing through at least one sampled volume 12a will contribute to the measurement of the average speed u, whereas fluid which only passes through non-sampled volumes 12b does not contribute to the measurement of the average speed u.

The controller 13 outputs a drive signal 14 to a transmitting ultrasonic transducer 2, 3 via an impedance matching resistor R and a first switch or multiplexer 15. The first switch 15 may be controlled to supply the drive signal 14 to either the first ultrasonic transducer 2 or the second ultrasonic transducer 3. Whichever ultrasonic transducer 2, 3 receives the drive signal 15 is the transmitting ultrasonic transducer for a measurement. The drive signal 15 may include a pulsed or square waveform having variable frequency, duty cycle and so forth.

Whichever ultrasonic transducer 2, 3 does not receive the drive signal 14 is the receiving ultrasonic transducer for a measurement. The receiving ultrasonic transducer 2, 3 detects an ultrasound signal from the transmitting ultrasonic transducer 2, 3, and converts it into a received electrical signal 16. The received signal 16 is returned to the controller 13 via a second switch or multiplexer 17 and a signal conditioning circuit 18. The first and second switches 15, 17 are configured so that when, for example, the first switch 15 connects to the first ultrasonic transducer 2, the second switch 17 will connect to the second ultrasonic transducer 3, and vice-versa. The signal conditioning circuit 18 may perform amplification and/or filtering of the received signal 16 to generate a conditioned signal 19. The controller 13 is configured to determine the times-of-flight $t_1$, $t_2$. Determination of the first and second times-of-flight may be carried out using a variety of methods. For example, the controller 13 may determine the times-of-flight $t_1$, $t_2$ by comparing the drive signal 14 with the conditioned signal 19. Alternatively, the controller 13 may determine the times-of-flight $t_1$, $t_2$ by measuring a time between the start of the drive signal 14 and a reference point on the conditioned signal 19 such as, for example, reaching a certain signal amplitude or the $m^{th}$ zero of the oscillation with m a positive integer (i.e. counting m periods).

The controller 13 may be a microcontroller, a microprocessor, or any other suitable data processing apparatus. In some examples, the controller 13, the signal conditioning circuit 18, and the first and second switches 15, 17 may all be integrated into a single integrated circuit in order to simplify the electronics of the ultrasonic meter 1.

The first and second ultrasonic transducers 2, 3 may be external to the flow conduit 5, as shown in FIG. 1. In such a configuration, first and second ultrasonic transducers 2, 3 may be connected to the flow conduit 5 using impedance matching materials 20 to enhance transmission of ultrasound in and/or out of the flow conduit 5. Alternatively, the first and/or second ultrasonic transducers 2, 3 may be embedded within, or integrally formed as part of, a wall defining the flow conduit 5. In other examples, the first and/or second ultrasonic transducers 2 may be located within the flow conduit 5.

Referring also to FIG. 2, a second ultrasonic meter 21 useful for understanding the present invention is shown. Only the centroid of the beam path 9 is shown in FIG. 2.

The second ultrasonic meter 21 is similar to the first ultrasonic meter 1, except that the second ultrasonic transducer 3 is arranged on the second side 11 of the flow conduit 5, such that the beam path 5 does not include a reflection, and such that $\tan(\theta_2)=D/d$.

As described hereinbefore, ultrasonic meters 1, 21 measure an average fluid speed u which depends only on the fluid which intersects the beam path 9. Any fluid which passes through the measurement region 12 without passing across the beam path 9 at least once (passes only through non-sampled volumes 12b) does not contribute to the measurement. Including a reflection in the beam path 9, as in the first ultrasonic meter 1, may extend the length of the beam path 9 compared to the second ultrasonic meter 21. However, some fluid will still not intersect the beam path 9. Consequently, in the first and second ultrasonic meters 1, 21, only a fraction of the actual fluid flow which passes through sampled volumes 12a is measured.

Conversion of the measured average speed u into a mass flow rate of the fluid relies upon an assumed speed u across the flow conduit 5 and known cross sectional area.

For example, referring also to FIG. 3, an example of an assumed flow speed profile 22 is plotted.

The exemplary assumed flow speed profile 22 corresponds to a cylindrical flow conduit 5 and is described by the empirical equation:

$$u(y) = u^* \left(\frac{y}{r}\right)^{\frac{1}{n}} \quad (3)$$

In which y is the distance from the first/second side 10, 11, perpendicular to the first axis 6, u(y) is the local flow speed at position y, u* is the average flow speed measured by the ultrasonic meter 1, 21, r is the radius of the cylindrical flow conduit 5 and n is an empirically derived exponent. FIG. 3 plots relative speed u(y)/u* on the vertical axis against relative distance across the flow conduit y/r for a value of n=10.

The value of n will depend on various properties of the ultrasonic meter 1, 21 and fluid including, but not limited to, the flow rate, temperature, fluid viscosity and the geometry of the ultrasonic meter 1, 21.

A variety of techniques exist for correcting for the flow speed profile 22 in an ultrasonic meter 1, 21. One option is to empirically, theoretically or computationally determine a correction factor to apply to the flow rate. Another option is to position the ultrasonic beams in such a way that when they are added together they remain constant and independent of the flow profile.

However, any deviation of the actual local flow speeds from the assumed local flow speeds u(y) will introduce errors into the estimate of the mass flow of fluid passing the ultrasonic meter 1, 21. When an ultrasonic meter 1, 21 is installed in, or directly downstream of, a long, straight section of pipe, an actual flow speed profile may be relatively close to an assumed flow speed profile 22 determined from empirical measurements and/or modelling using fluid dynamics. However, proximity of bends, valves, pumps, constrictions and so forth either upstream or downstream of an ultrasonic meter 1, 21 will cause the actual flow speed profile to differ from an assumed flow speed profile 22, reducing accuracy of the ultrasonic meter 1, 21. Such disturbances are difficult to predict and may also vary depending on the flow rate, temperature and so forth. In practical installations, there may not be a sufficiently long, straight section of piping in which to install an ultrasonic meter 1, 21 to ensure accurate measurements.

In the context of chemical plants or manufacturing processes, accurate knowledge of how much fluid has flowed/is flowing along a flow conduit 5 may be important for process efficiency, process control and/or safety. In an economic context, if an ultrasonic flow meter 1, 21 is used to meter a quantity of fluid supplied from a provider to a consumer, measurement errors will cause the consumer to be overcharged or the provider to be underpaid. Therefore, there has been interest in improving the accuracy of ultrasonic meters 1, 21.

One approach has been to add further pairs of ultrasonic transducers 2, 3 in order to define additional beam paths 9 and increase a fraction of the fluid which is sampled. In other words, in order to increase the relative fraction of sampled volumes 12a compared to non-sampled volumes 12b. However, adding further pairs of ultrasonic transducers 2, 3 increases the cost and complexity of an ultrasonic meter 1, 21, and there will always be some residual non-sampled volumes 12b within the measurement region 12, which are not sampled by any beam path 9.

Another approach to improving the accuracy of an ultrasonic meter 1, 21 has been to install one of more flow conditioning devices 23 (FIG. 4) upstream and/or downstream of an ultrasonic meter 1, 21. Flow conditioning devices 23 (FIG. 4) are used to force the flow speed profile into a known assumed flow speed profile.

Referring also to FIG. 4, an example of a flow conditioning device 23 is shown.

The exemplary flow conditioning device 23 includes a cylindrical body 24 dimensioned to fit across a cylindrical flow conduit 5, and including a number of through-holes 25 which permit flow of the fluid.

Referring also to FIG. 5, flow of a fluid through, and downstream of, a flow conditioning device 23 is illustrated.

As the fluid is forced through the flow conditioning device 23, a jet 26 emerges from each through-hole 25. As the fluid continues to flow along the flow conduit 5, the jets 26 gradually merge. A distance m.D after the flow conditioning device 23, in which m is a scalar multiplier m>0, the fluid develops a stable flow speed profile 27. The multiplier m is usually a factor of about 4 or 5, i.e. a distance of 4 or 5 times the diameter D of a cylindrical flow conduit 5. An ultrasonic flow meter 1, 21 cannot be placed too close to the flow conditioning device 23, as a flow speed profile which is changing across the measurement region 12 will also lead to inaccurate measurements. However, if the ultrasonic meter 1, 21 is placed at least m.D away from the flow conditioning device 23, a repeatable flow speed profile may be obtained.

The flow conditioning device 23 shown in FIGS. 4 and 5 is only one example, and a wide range of different structures are available, though all operate according to similar principles.

Although flow conditioning devices allow greater flexibility in the locations for installing an ultrasonic meter 1, 21, a straight section of sufficient length to permit development of a stable flow speed profile 27 is still required. Additionally, as a flow conditioning device 23 is required to effectively reset the flow speed profile, significant impacts on the flow are unavoidable, and pressure drops across flow conditioning devices may be substantial. Flow conditioning devices 23 may also increase the complexity of installing an ultrasonic meter 1, 21, as two devices are installed at two different locations. Some applications have requirements which may prevent the use of many common flow conditioning devices 23. For example, in fluids which may entrain solid matter, a flow conditioning device 23 as shown in FIGS. 4 and 5 may be susceptible to clogging.

The present specification concerns ultrasonic meters and/or inserts for ultrasonic meters which reduce sensitivity to variations in the flow speed profile of fluids. The ultrasonic meters and/or inserts according to the present specification may increase the range of location in which an ultrasonic meter may be installed whilst providing accurate measurements. The ultrasonic meters and/or inserts according to the present specification may reduce a pressure drop, by comparison to a flow conditioning device 23.

In contrast to conventional approaches such as conditioning the flow to provide a repeatable and reliable assumed flow speed profile 22, the present specification does not try to control the flow speed profile. Instead, the present specification describes using protrusions which extend into/across the measurement region 12 of a flow conduit 5 to at least partially exclude fluid from at least a part of one or more non-sampled volumes 12b of the measurement region 12. In this way, fluid may be displaced out of non-sampled volumes 12b and into sampled volumes 12a, i.e. into the beam path(s) 9. In this way, a fraction of fluid which is sampled may be relatively increased. In some examples, substantially all of the fluid may be re-directed through one or more beam paths 9 by the protrusions. In other words, substantially all of the non-sampled volumes 12b may be excluded to fluid flow using protrusions. By displacing the fluid into the beam paths 9 to contribute to the measurement of average speed u*, the present invention does not rely on an assumed flow speed profile. Consequently, the sensitivity of an ultrasonic meter to disturbances caused by corners, valves, constrictions, pumps and so forth may be reduced.

First Ultrasonic Meter

Referring to FIG. 6, a first ultrasonic meter 28 for measuring a flow-rate of a fluid is shown.

The first ultrasonic meter 28 includes a flow conduit 5 extending along a first axis 6 between a first opening 7 and a second opening 8. The flow conduit 5 in the first ultrasonic meter 28 is defined by the interior surfaces of a cylindrical tube 29, terminated at either end by a flange 30. The cylindrical tube 29 is positioned between a first pipe 31 and a second pipe 32 by bolts 33 passing through respective flanges 30 of the cylindrical tube 29 and pipes 31, 32. Joints between the cylindrical tube 29 and the pipes 31, 32 include gaskets (not shown) or other sealing means to prevent fluids from leaking. The flow path 4 may be either from the first opening 7 towards the second opening 8, or vice versa.

The first ultrasonic meter 28 includes one or more pairs of first and second ultrasonic transducers 2, 3. The beam path 9 includes a reflection from the second side 11, or from a reflector element mounted in, on or near the second side 11. One pair of ultrasonic transducers 2, 3 is illustrated in FIG. 6, but other pairs of ultrasonic transducers 2, 3 may be oriented in planes outside the illustrated cross-section to define further beam paths 9. Each pair of ultrasonic transducers 2, 3 is configured to define a corresponding beam path 9 which intersects the flow conduit 5 within a measurement region 12 which spans between a first position $z_1$ and a second position $z_2$ spaced apart along the first axis 6. In general, the measurement region corresponds to a volume which is bounded by the first position $z_1$, the second position $z_2$, and one or more interior surfaces 10, 11 which define the flow conduit 5. In general, the first position $z_1$ is the point where, moving in the direction from the first opening 7 to the second opening 8, a beam path 9 first enters the flow conduit 5. Similarly, the second position $z_2$ is the point where, moving in the direction from the second opening 8 to the first opening 7, a beam path 9 first enters the flow conduit 5.

The beam path 9 has a finite effective cross-sectional area (e.g. a circle of diameter $w_b$). Each beam path 9 includes a component parallel to the first axis 6, and may include a component transverse (perpendicular) to the first axis 6. In some examples, beam path(s) may not be parallel to the first axis 6, i.e. the each beam path will include a component transverse (perpendicular) to the first axis 6. The effective cross-sectional area of the beam path 9 defines the sampled volume(s) 12a and non-sampled volumes 12b as described hereinbefore.

In general, the flow conduit 5 and ultrasonic transducers 2, 3 of the first ultrasonic meter 28 may be the same as in conventional ultrasonic meters 1, 21. The first ultrasonic meter 28 differs primarily by the addition of one or more protrusions 34 extending along the first axis 6. At least part of each protrusion 34 is arranged to exclude fluid from at least part of one or more non-sampled volumes 12b of the measurement region 12. In this way, each protrusion 34 is configured to re-direct fluid out of the non-sampled volume(s) 12b and through the one or more beam paths 9 (sampled volumes 12a).

Another way to express the effect of the protrusions 34 is that each protrusion 34 acts to increase a mass fraction of the fluid which intersects (passes through) the one or more beam paths 9. The increase in mass fraction is with respect to an ultrasonic meter (not shown) which is identical to the first ultrasonic meter 28, except for omission of the protrusions 34. A mass fraction of the fluid which intersects the one or more beam paths 9 may be defined as a mass of fluid which passes through the one or more beam paths 9 in unit time, divided by a mass of fluid which enters (or leaves) the flow conduit 5 via the first or second opening 7, 8 in unit time.

The flow conduit 5 is configured such that an average flow vector of fluid passing through the flow conduit 5 remains substantially parallel to the first axis 6 throughout the measurement region 12. Substantially parallel may mean within ±5 degrees of the first axis 6, or within ±10 degrees of the first axis 6. An average flow vector may be calculated for each point along the first axis 6 by averaging a vector field corresponding to the fluid velocity u across a cross-section of the flow conduit 5 perpendicular to the first axis 6. In other words, the flow of fluid along the flow conduit 5 is substantially straight and does not include undulations, curves, bends and so forth. The flow of fluid along the flow conduit 5 may include rotation and/or twisting about the first axis 6.

The electronics 13, 15, 17, 18 of the first ultrasonic meter 28 are substantially the same as the conventional ultrasonic meter 1, and are not shown again. Additionally, the controller 13, switches 15, 17 and signal conditioning circuit 18 may be integrated into a single package. The electronics 13, 15, 17, 18 may be implemented using one or more microcontrollers, microprocessors, computing devices, field programmable gate arrays, or other suitable means known in the field of automated measurement and control. The electronics 13, 15, 17, 18 may be implemented using single, application specific integrated circuit. The ultrasonic meter 28 may also include a display (not shown) for indicating a measured flow rate of fluid, a total volume of fluid passed since a last reading and/or since installation, and so forth.

The ultrasonic meter 28 may also include a communications interface (not shown) for outputting a flow rate, a total volume passed since a last reading or since installation, and so forth. The communications interface (not shown) may support FlexNet®. The communications interface may support a wireless connection to local wired or wireless network. The communications interface (not shown) may support a wireless connection to mobile communications networks. The ultrasonic meter 28 may use the communications interface (not shown) to communicate measurement of flow rates and/or flow volumes to a remote terminal (not shown) and/or a remote server (not shown). The ultrasonic meter 28 may be powered by mains electricity or by one or more batteries. The ultrasonic meter 28 may include energy harvesting elements, for example one or more photovoltaic cells, thermocouples or other energy harvesting elements suitable for a particular installation location.

Second Ultrasonic Meter

Figure 7:
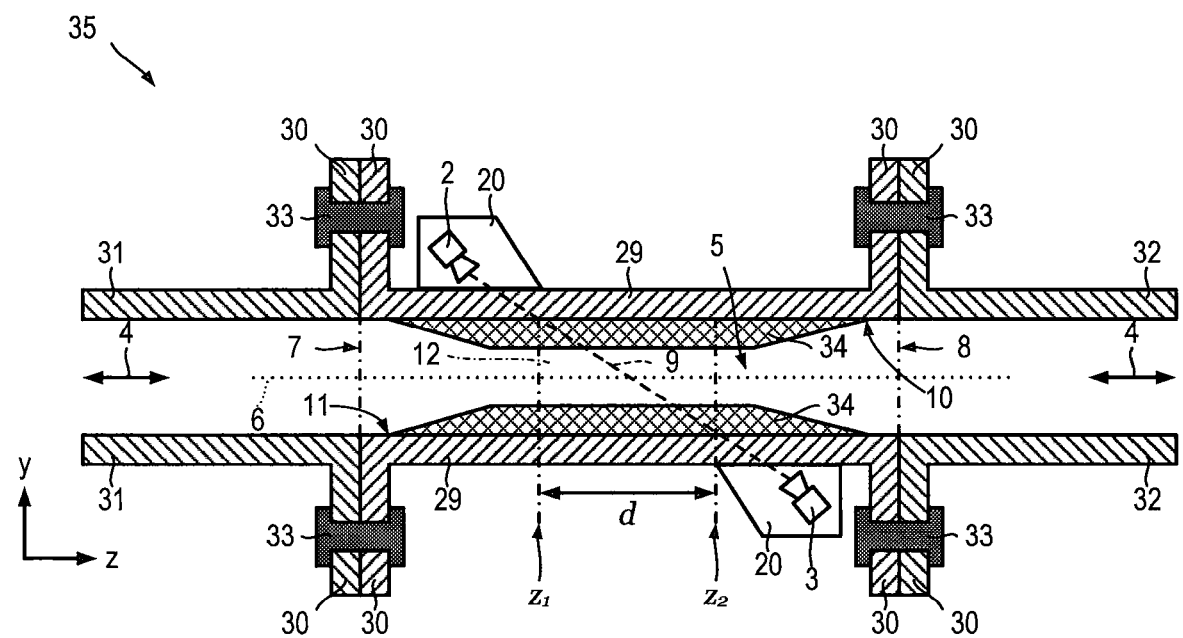
FIG. 7 is a schematic cross-section which illustrates a second ultrasonic meter.

Referring also to FIG. 7, a second ultrasonic meter 35 is shown.

The second ultrasonic meter 35 is the same as the first ultrasonic meter 28, except that the beam path(s) 9 do not include a reflection. Only the centroid of the beam path 9 is shown in FIG. 7 (and subsequent figures).

First Configuration of Protrusions

Figure 8:
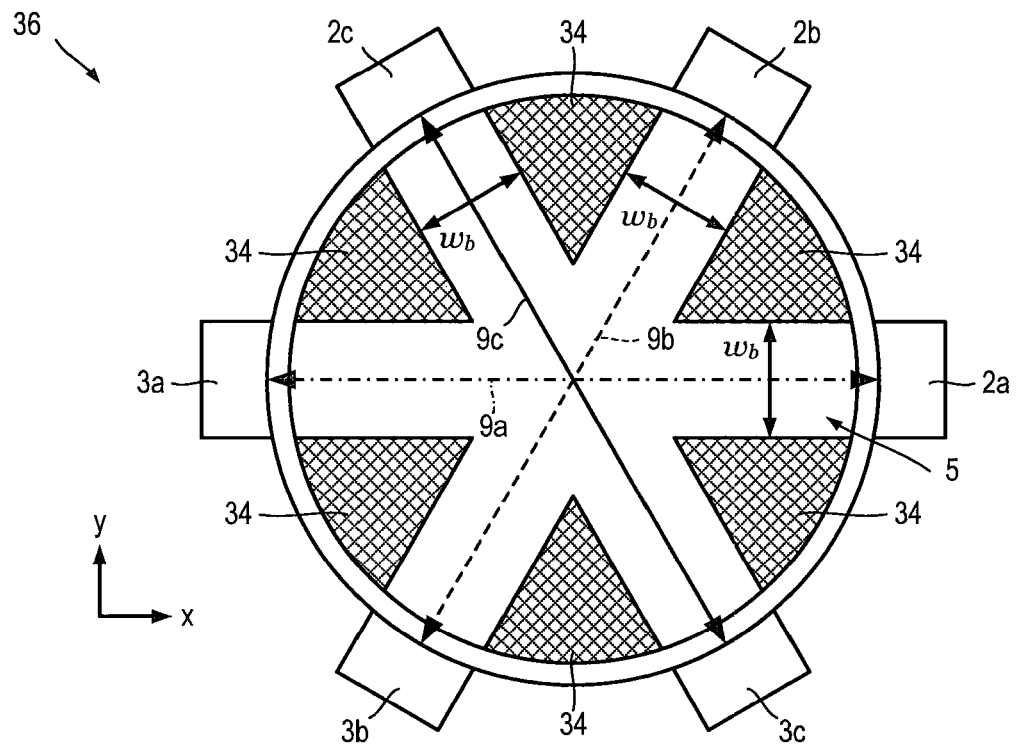
FIG. 8 is a schematic end-on view which illustrates a first configuration of protrusions for an ultrasonic meter.

Referring also to FIG. 8, a first configuration 36 of protrusions 34 and beam paths 9 is shown.

The first configuration 36 includes three pairs of ultrasonic transducers 2, 3 and six protrusions 34 spread around the perimeter of the flow conduit 5. A first pair of ultrasonic transducers 2a, 3a are spaced on opposite sides of the flow conduit 5 to define a first beam path 9a which has a transverse component parallel to a second direction x that is perpendicular to the first axis 6, z. The ultrasonic transducers 2a, 3a are still spaced apart along the first axis 6 so that the first beam path 9a has a longitudinal component along the first axis 6 for measuring flow. A second pair of ultrasonic transducers 2b, 3b are spaced on opposite sides of the flow conduit 5 to define a second beam path 9b having a transverse component which makes an angle of 60 degrees with the second direction x. The ultrasonic transducers 2b, 3b are still spaced apart along the first axis 6 so that the second beam path 9b has a longitudinal component along the first axis 6 for measuring flow. A third pair of ultrasonic transducers 2c, 3c are spaced on opposite sides of the flow conduit 5 to define a third beam path 9c having a transverse component which makes an angle of 120 degrees with the second direction x and an angle of 60 degrees with the transverse component of the second beam path 9b. The ultrasonic transducers 2c, 3c are still spaced apart along the first axis 6 so that the third beam path 9c has a longitudinal component along the first axis 6 for measuring flow The protrusions 34 have a generally triangular cross-section extending into the flow conduit 5, and are spaced with respect to the second direction x at angles of about 30, 90, 150, 210, 270 and 330 degrees. In this way, the beam paths 9a, 9b, 9b are located in spaces between the protrusions. Gaps between the protrusions 34 have a width $w_b$ roughly corresponding to the effective width $w_b$ of the beam paths 9a, 9b, 9c. The effective width $w_b$ of the beam paths 9a, 9b, 9c is typically less than a physical width of the transducers 2, 3. In this way, by excluding fluid flow from entering non-sampled volumes 12b between the beam paths 9a, 9b, 9c, the protrusions 34 may act to re-direct substantially all of the fluid flowing through the flow conduit 5 through beam paths 9a, 9b, 9c. Consequently, average speeds u* measured using the first, second and third beam paths 9a, 9b, 9c may sample substantially all of the fluid flow. This may permit a mass flow to be estimated without a need to make an assumption about a flow speed profile 22 across the flow conduit 4. In this way, the sensitivity of an ultrasonic meter 28, 35 to flow disturbances may be reduced. Additionally, as the protrusions 34 need only displace the fluid out of non-sampled volumes 12b and into the beam paths 9, a pressure drop across the protrusions may be less than for a flow conditioning device 23.

Further, as the protrusions 34 leave a central region of the flow conduit 5 open, the ultrasonic meters 28, 35 may be more resistant to clogging than a flow conditioning device 23.

The first configuration 36 may be used for the protrusions 34 and beam paths 9 of the second ultrasonic meter 35. Alternatively, by incorporating reflections into each of the three beam paths 9a, 9b, 9c, the first configuration 36 may be readily adapted for the protrusions 34 and beam paths 9 of the first ultrasonic meter 28.

The first and second ultrasonic meters 28, 35 have been illustrated with a flow conduit 5 in the form of a cylindrical tube 29 inserted in-line between first and second pipes 31, 32. However, this arrangement is not essential, and in general the flow conduit 5 may take the form of a relatively short, straight section having any cross-sectional shape, and potentially having bends, valves, pumps or other flow disturbing features immediately upstream and/or downstream.

Third Ultrasonic Meter

Figure 9:
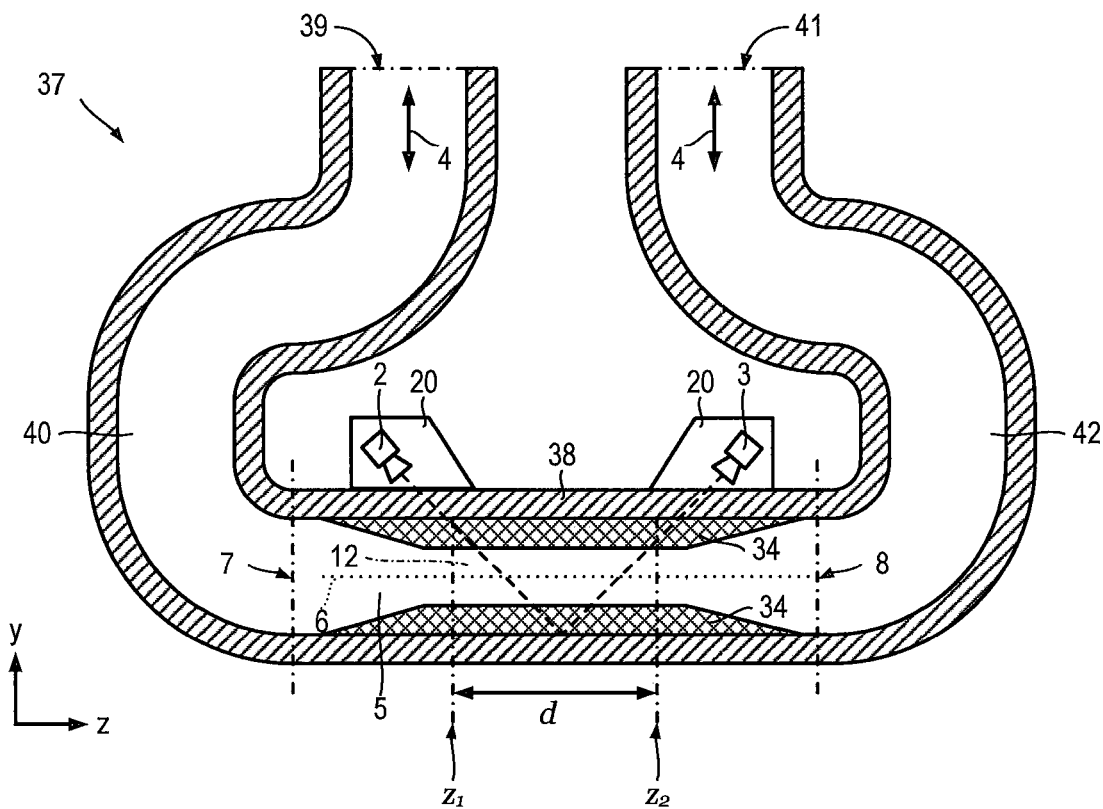
FIG. 9 is a schematic cross-section which illustrates a third ultrasonic meter.

Referring also to FIG. 9, a third ultrasonic meter 37 is shown.

The third ultrasonic meter 37 is the same as the first or second ultrasonic meters 28, 35, except that the flow conduit 5 is defined by a straight portion 38 which is connected between the first opening 7 and a first inlet/outlet 39 by a first conduit 40, and between the second opening 8 and a second inlet/outlet 41 by a second conduit 42.

The first and second conduits 40, 42 may include straight, curved or branching path portions. Any features of the first and second conduits 40, 42 will not significantly influence the operation of the third ultrasonic meter 37, because the protrusions 34 are designed to provide significant immunity against flow disturbances. The first and second conduits 40, 42 may be an integral part of the third ultrasonic meter 37. For example, the third ultrasonic meter 37 may correspond to a gas meter employing a siphon arrangement, with the first and second inlet/outlets 39, 41 connected to a larger gas pipeline. Alternatively, in other examples the first and second conduits 40, 42 may be separate pipes or other components connected to the third ultrasonic meter 37, illustrating the flexibility of installation locations enabled by ultrasonic meters 28, 35, 37 according to the present specification.

The third ultrasonic meter 37 may use the first configuration 36 of protrusions 34 and beam paths 9.

In the first, second and third ultrasonic meters 28, 35, 37, the protrusions 34 have been shown as extending into the flow conduit 5 directly from the interior walls of the flow conduit 5. For example, the protrusions 34 may be directly bonded or attached inside the flow conduit 5, or integrally formed as part of the flow conduit 5. In examples in which the protrusions 34 are attached to, or formed as part of, the flow conduit 5, the protrusions 34 act to increase the mass fraction of fluid intersecting the one or more beam paths 9 with respect to an ultrasonic meter including a flow conduit 5 which is the same except that the protrusions 34 are omitted.

However, in some examples, the protrusions 34 may instead be mounted to, or integrally formed as part of, an insert 44 (FIG. 10) secured inside the flow conduit 5.

Fourth Ultrasonic Meter and Insert

Figure 10:
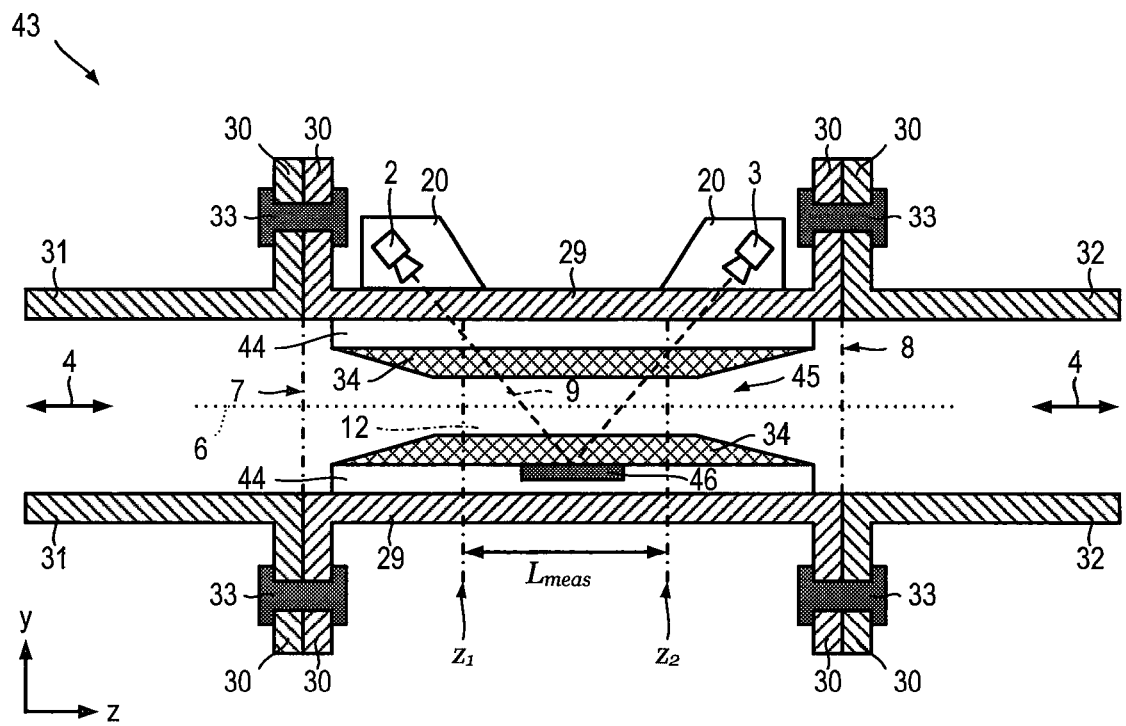
FIG. 10 is a schematic cross-section which illustrates a fourth ultrasonic meter which includes an insert.
Figure 11:
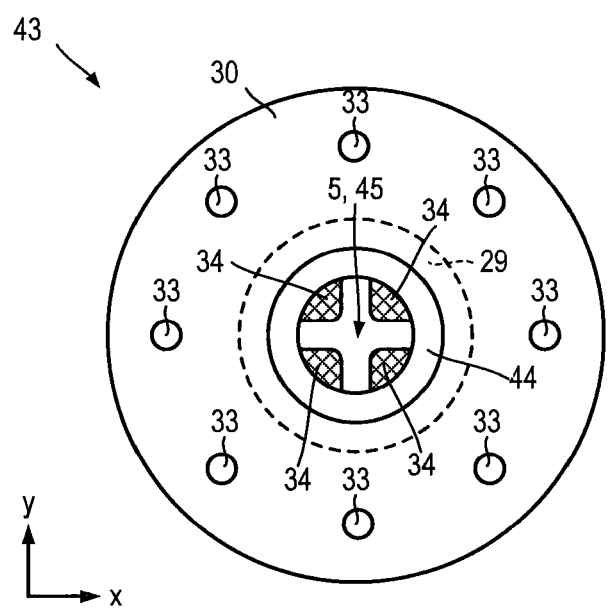
FIG. 11 is a schematic end-on view of the fourth ultrasonic meter shown in FIG. 10.

Referring also to FIGS. 10 and 11, a fourth ultrasonic meter 43 including an insert 44 is shown.

The insert 44 includes a through passage 45, and the protrusions 34 are attached to, or formed as part of, the insert 44. The insert 44 is secured within the flow conduit 5 so that the protrusions 34 are within, or at least partly within, the measurement region 12. When the insert is installed, each protrusion 34 acts to exclude fluid flow from at least part of one or more non-sampled volumes 12b, so as to displace fluid through the beam paths 9. The through passage 45 may be slightly constricted with respect to the flow conduit 5. Such constriction is preferably minimised to avoid unnecessary pressure drops across the fourth ultrasonic meter 43.

The insert 44 may be formed as a single piece, or the insert 44 may be formed from two or more pieces joined together. Fabricating the insert 44 in two or more pieces may simplify production of the structures defining the protrusions 34. When the protrusions 34 are defined by the insert 44, a mass fraction of fluid intersecting the one or more beam paths 9 may be increased with respect to an ultrasonic meter 43 including an insert 44 which is same except that the one or more protrusions 34 are omitted.

In the fourth ultrasonic meter 43, all of the protrusions 34 are attached to, or formed as part of, the insert 44. However, in alternative examples, some protrusions 34 may be attached to (or formed as part of) the insert 44, whilst other protrusions 34 may be attached to (or formed as part of) the flow conduit 5.

Where one or more of the beam paths 9 include a reflection, the insert 44 may include corresponding reflectors 46. Alternatively, the insert 44 may be configured to permit internal reflection from one or more reflection surfaces.

The insert 44 has been described as including through passage 45. However, in some examples the insert 44 may only partly define the through passage 44. For example, an insert may extend only partway around the perimeter of the flow conduit 5, so that the through passage 44 is partly defined by the insert 44 and partly defined by an interior surface of the floe conduit 5.

Alternative Configurations of Beam Paths and Protrusions

The first configuration 36 is only one example of arranging protrusions 34 so as to exclude fluid from at least part of one or more non-sampled volumes 12b, in order to deflect that fluid into one or more beam paths 9. It will be apparent that the geometry of the protrusions 34 will depend on the arrangement of beam paths 9 in any given application, because the beam paths 9 define the non-sampled volumes 12b of the measurement region 12.

Referring also to FIG. 12, a second configuration 47 is shown corresponding to a single protrusion 48.

The second configuration 47 includes a single protrusion 48 having a generally triangular cross-section, with one side truncated by the curve of the flow conduit 5. The beam path 9 is a two-chord path (see also FIGS. 26A and 26B) having a first transverse portion 49a and a second transverse portion 49b. The beam path 9 also has a component parallel to the first axis 6—the path drawn in FIG. 12 is a projection onto a cross-section of the flow conduit 5. The first transverse portion 49a follows a chord to the circular cross-section of the flow conduit 5. The second transverse portion 49b also follows a chord to the circular cross-section of the flow conduit 5, and meets the first transverse portion 49a at a reflection point 50. The reflection point 50 may take the form of a reflector such as a metal plate, or may be an internal reflection from the material of the flow conduit 5 or insert 44. The reflection point 50 is located opposite the single protrusion 48. In this way, the beam path 9, 49a, 49b follows up one side of the protrusion 48, before reflecting down the other side of the protrusion 48.

The protrusion 48 of the second configuration 47 will have the effect of excluding fluid from at least part of one or more non-sampled volumes 12b, and displacing that fluid into the beam path 9, 49a, 49b, thereby increasing a mass fraction of fluid sampled by the beam path 9, 49a, 49b. The second configuration 47 may be used in any of the first, second, third or fourth ultrasonic meters 28, 35, 37, 43.

Referring also to FIG. 13A, a third configuration 51 is shown corresponding to two protrusions 52.

The pair of protrusions 52 are arranged on opposite sides of the flow conduit 5, and have generally trapezoidal cross-sections, with long parallel sides truncated by the curve of the flow conduit 5. The beam path 9 includes a transverse component passing straight across the middle of the flow conduit 5 between the protrusions 52. If the beam path 9 is parallel to a second direction x, then the protrusions are arranged at angles of 90 and 270 degrees with respect to the second direction x. An effective beam width $w_b$ of the beam path 9 may be substantially equal to a spacing of the protrusions 52 to either side of beam path 9. The beam path 9 may include no reflections (see also FIGS. 7, 20A and 20B), one reflection (see also FIGS. 6, 21A, 21B), two reflections, three reflection (see also FIGS. 25A, 25B), or even more reflections. The beam path 9 shown in FIG. 13A is a projection onto a cross section of the flow conduit 5, and the beam path 9 also has a component parallel to the first axis 6.

The protrusions 52 of the third configuration 51 will have the effect of excluding fluid from at least part of one or more non-sampled volumes 12b, and displacing that fluid into the beam path 9, 49a, 49b, thereby increasing a mass fraction of fluid sampled by the beam path 9, 49a, 49b. The third configuration 51 may be used in any of the first, second, third or fourth ultrasonic meters 28, 35, 37, 43.

Referring also to FIG. 13B, a fourth configuration 53 is shown corresponding to two protrusions 54.

The pair of protrusions 54 are arranged on opposite sides of the flow conduit 5, and have generally rectangular cross-sections, with one side each truncated by the curve of the flow conduit 5. Two beam paths 9 are defined, a first beam path 55a and a second beam path 55b. Both beam paths 55a, 55b have transverse components running parallel to a line between the protrusions 54. The first beam path 55a passes to one side of the protrusions 54, and the second beam path 55b passes to the other side of the protrusions 54. The beam paths 55a, 55b may include no reflections (see also FIGS. 7, 20A and 20B), one reflection (see also FIGS. 6, 21A, 21B), two reflections, three reflection (see also FIGS. 25A, 25B), or even more reflections. The beam paths 55a, 55b shown in FIG. 13B are projections onto a cross section of the flow conduit 5, and each beam path 55a, 55b also has a component parallel to the first axis 6.

The protrusions 54 of the fourth configuration 53 will have the effect of excluding fluid from at least part of one or more non-sampled volumes 12b, and displacing that fluid into the beam paths 9, 55a, 55b, thereby increasing a mass fraction of fluid sampled by the beam path 9, 55a, 55b. The fourth configuration 53 may be used in any of the first, second, third or fourth ultrasonic meters 28, 35, 37, 43.

Referring also to FIG. 14, a fifth configuration 56 is shown corresponding to three protrusions 57.

Each protrusion 57 has a generally triangular cross-section, with one side truncated by the curve of the flow conduit 5. The three protrusions 57 are spaced about the circular perimeter of the flow conduit 5 at 120 degree intervals. For example, at angles of 30, 150 and 270 degrees with respect to the second direction x. The beam path 9 forms a three-chord bounce configuration (see also FIGS. 23A and 23B), including first, second and third transverse path portions 58a, 58b, 58c. The transverse path portions 58a, 58b, 58c form an equilateral triangle, with vertices corresponding to transducers 2, 3 or reflectors 46 located at the midpoints of the spaces between the protrusions 57. The beam path 9, 58a, 58b, 58c shown in FIG. 14 is a projection onto a cross section of the flow conduit 5, and the beam path 9 58a, 58b, 58c also has a component parallel to the first axis 6.

Alternatively, each of the first, second and third transverse path portions 58a, 58b, 58c may correspond to a separate beam path 9 including one, two, three or more reflections.

The protrusions 57 of the fifth configuration 56 will have the effect of excluding fluid from at least part of one or more non-sampled volumes 12b, and displacing that fluid into the beam path 9, 58a, 58b, 58c, thereby increasing a mass fraction of fluid sampled by the beam path 9, 58a, 58b, 58c. The fifth configuration 56 may be used in any of the first, second, third or fourth ultrasonic meters 28, 35, 37, 43.

Referring also to FIG. 15, a sixth configuration 59 is shown corresponding to four protrusions 60.

Each protrusion 60 has a generally triangular cross-section, with one side truncated by the curve of the flow conduit 5. The four protrusions 57 are spaced about the circular perimeter of the flow conduit 5 at 90 degree intervals. For example, at angles of 45, 135, 225 and 315 degrees with respect to the second direction x. Two beam paths 61a, 61b are defined. A first beam path 61a runs across the middle of the flow conduit 5, and in the middle of an opposed pair of spaces between the protrusions 60. A second beam path 61b runs across the middle of the flow conduit 5, perpendicular to the first beam path 61a, and in the middle of an opposed pair of spaces between the protrusions 60. For example, as illustrated in FIG. 15 the first beam path 61a may run parallel to the second direction x and the second beam path 61b may run parallel to a third direction y perpendicular to the second direction x and the first axis 6, z. The spacing between adjacent protrusions 60 may be equal to an effective width $w_b$ of the beam paths 61a, 61b. The beam paths 61a, 61b may include no reflections (see also FIGS. 7, 20A and 20B), one reflection (see also FIGS. 6, 21A, 21B), two reflections, three reflection (see also FIGS. 25A, 25B), or even more reflections. The beam paths 61a, 61b shown in FIG. 15 are projections onto a cross section of the flow conduit 5, and each beam path 61a, 61b also has a component parallel to the first axis 6.

The protrusions 60 of the sixth configuration 59 will have the effect of excluding fluid from at least part of one or more non-sampled volumes 12b, and displacing that fluid into the beam paths 61a, 61b, thereby increasing a mass fraction of fluid sampled by the beam paths 61a, 61b. The sixth configuration 59 may be used in any of the first, second, third or fourth ultrasonic meters 28, 35, 37, 43.

Referring also to FIG. 16, a seventh configuration 62 is shown corresponding to six protrusions 63.

Each protrusion 63 has a generally triangular cross-section, with one side truncated by the curve of the flow conduit 5. The six protrusions 63 are spaced about the circular perimeter of the flow conduit 5 at 60 degree intervals. For example, at angles of 0, 60, 120, 180, 240 and 300 degrees with respect to the second direction x. A pair of beam paths 64a, 64b are defined, each forming a three-chord bounce configuration similar to the fifth configuration 56 (see also FIGS. 23A and 23B). Each of the beam paths 64a, 64b forms an equilateral triangle, with vertices corresponding to transducers 2, 3 or reflectors 46 located at the midpoints of the spaces between the protrusions 63. For example, the first beam path 64a may have vertices at angles of 30, 150 and 270 degrees with respect to the second direction x, and the second beam path 64b may have vertices at angles of 90, 210 and 330 degrees with respect to the second direction x. The beam paths 64a, 64b shown in FIG. 16 are projections onto a cross section of the flow conduit 5, and each beam paths 64a, 64b also has a component parallel to the first axis 6.

Alternatively, each side (chord) of the first and second beam paths 64a, 64b may correspond to a separate beam path 9 including one, two, three or more reflections.

The protrusions 63 of the seventh configuration 62 will have the effect of excluding fluid from at least part of one or more non-sampled volumes 12b, and displacing that fluid into the beam paths 64a, 64b, thereby increasing the mass fraction of fluid sampled by the beam paths 64a, 64b. The sixth configuration 62 may be used in any of the first, second, third or fourth ultrasonic meters 28, 35, 37, 43.

Figure 17:
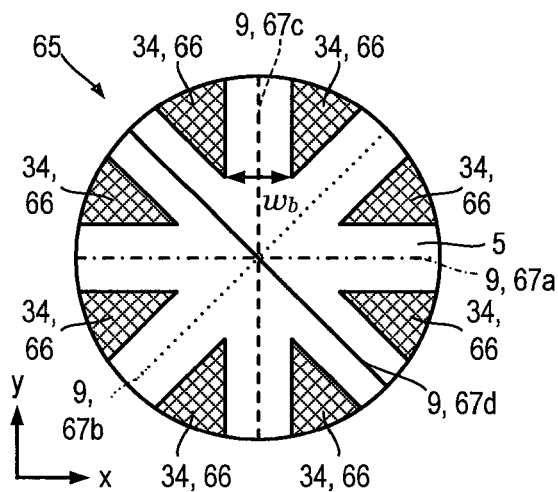

Referring also to FIG. 17, an eighth configuration 65 is shown corresponding to eight protrusions 66.

Each protrusion 66 has a generally triangular cross-section, with one side truncated by the curve of the flow conduit 5. The eight protrusions 66 are spaced about the circular perimeter of the flow conduit 5 at 45 degree intervals. For example, at angles of 22.5, 67.5, 112.5, 157.5, 202.5, 247.5, 292.5 and 337.5 degrees with respect to the second direction x. Four beam paths 67a, 67b, 67c, 67d are defined, all passing across the centroid of the flow conduit 5, and in the middle of an opposed pair of spaces between the protrusions 66. For example, the first beam path 67a may run parallel to the second direction x, the second beam path 67b may run between points on the perimeter at angles of 45 and 225 degrees with respect to the second direction x, the third beam path 67c may run between points on the perimeter at angles of 90 and 270 degrees with respect to the second direction x, and the fourth beam path may run between points on the perimeter at angles of 135 and 315 degrees with respect to the second direction x. The spacing between adjacent protrusions 66 may be equal to a width $w_b$ of the beam paths 67a, 67b, 67c, 67d. The beam paths 67a, 67b, 67c, 67d may include no reflections (see also FIGS. 7, 20A and 20B), one reflection (see also FIGS. 6, 21A, 21B), two reflections, three reflection (see also FIGS. 25A, 25B), or even more reflections. The beam paths 67a, 67b, 67c, 67d shown in FIG. 17 are projections onto a cross section of the flow conduit 5, and each beam path 67a, 67b, 67c, 67d also has a component parallel to the first axis 6.

The protrusions 66 of the eighth configuration 65 will have the effect of excluding fluid from at least part of one or more non-sampled volumes 12b, and displacing that fluid into the beam paths 67a, 67b, 67c, 67d, thereby increasing a mass fraction of fluid sampled by the beam paths 67a, 67b, 67c, 67d. The eighth configuration 65 may be used in any of the first, second, third or fourth ultrasonic meters 28, 35, 37, 43.

Any of the first to eighth configurations 36, 47, 51, 53, 56, 59, 62, 65 may be implemented using protrusions 34 attached to, or formed as part of, the flow conduit 5. Equally, any of the first to eighth configurations 36, 47, 51, 53, 56, 59, 62, 65 may be implemented using protrusions 34 attached to, or formed as part of, an insert 44.

Although the first to eighth configurations 36, 47, 51, 53, 56, 59, 62, 65 have been illustrated with respect to a flow conduit 5 or through passage 45 having a generally circular perimeter, this is not necessary. In other examples, flow conduits 5 may have cross-sections perpendicular to the first axis 6 which are square, rectangular, or any other regular or irregular shape.

Figure 18:
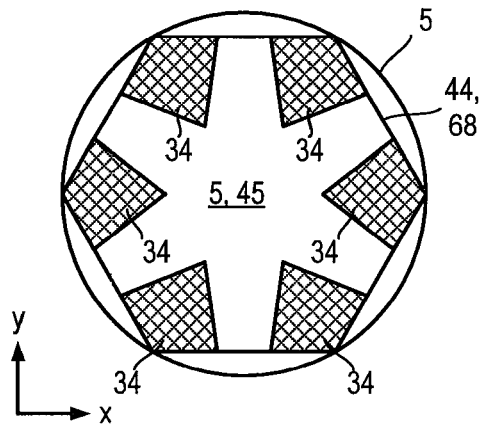
FIG. 18 is a schematic end-on view which illustrates a hexagonal insert for an ultrasonic meter.
Figure 19A:
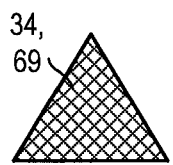
FIGS. 19A to 19G illustrate a range of cross-sectional shapes of protrusions for an ultrasonic meter.
Figure 19B:
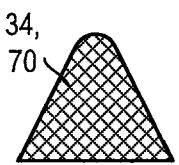
Figure 19C:
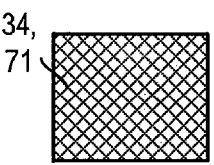
Figure 19D:
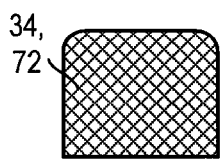
Figure 19E:
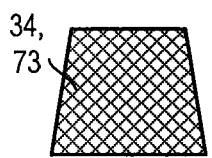
Figure 19F:
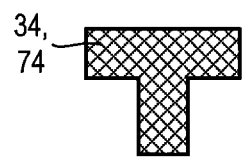
Figure 19G:
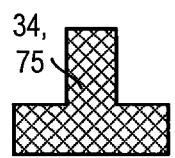

For example, referring also to FIG. 18, an example of the first configuration 36 is shown for a hexagonal insert 68 secured inside a circular flow conduit 5.

Triangular, trapezoidal and rectangular protrusions 34 have been illustrated. However, the protrusions 34 are not limited in cross-sectional shape, and may in general be shaped to exclude fluid from at least part of any non-sampled volume 12b of the measurement region 12.

For example, referring also to FIGS. 19A to 19G, examples of cross-sectional shapes for protrusions 34 are shown.

Triangular shaped protrusions 69 have been illustrated and described hereinbefore. A variant shape is a rounded triangular protrusion 70, in which a vertex extending into the flow conduit 5 may be softened to a curve to provide desired fluid flow properties. Similarly, rectangular protrusions 71 have been illustrated and described hereinbefore, and in some examples the vertices extending into the flow conduit 5 may be softened to curves to produce rounded rectangular protrusions 72. Trapezoidal protrusions 73 have been illustrated and described hereinbefore, and whilst not illustrated, the vertices extending into the flow conduit 5 may be softened to curves similarly to the rounded triangular or rectangular protrusions 70, 72. Other possible shapes include T-shaped protrusions 74 and inverted T-shaped protrusions 75, whether rounded or un-rounded.

In general, cross-sectional shapes of the protrusion 34 in a plane perpendicular to the first axis 6 may be determined based on fluid modelling to optimise a balance between increasing the mass fraction of fluid which intersects the one or more beam paths 9, whilst minimising a pressure drop across the ultrasonic meter 28, 35, 37, 43 and/or the insert 44.

Beam Paths

Ultrasonic meters 28, 35, 37, 43 according to the present specification may be configured to use any suitable beam path, including but not limited to the hereinafter described examples, each of which is equally applicable to ultrasonic meters 28, 35, 37, 43 with or without an insert 44.

Referring also to FIGS. 20A and 20B, a first beam path type 76 is illustrated.

The first beam path type 76, also described as a "transverse" beam path 76, is simply a straight path having a transverse component bisecting the cross-section of the flow conduit 5 or through path 45 when viewed along the first axis 6. When viewed perpendicular to the first axis 6, a transverse beam path 76 lies diagonally across the measurement region 12. As illustrated in FIG. 7, the second ultrasonic meter 35 includes a transverse beam path 76.

Referring also to FIGS. 21A and 21B, a second beam path type 77 is illustrated.

The second beam path type 77, also described as a "V-bounce" beam path 77, also has a transverse component bisecting the cross-section of the flow conduit 5 or through path 45 when viewed along the first axis 6. When viewed perpendicular to the first axis 6, a V-bounce beam path 77 includes one reflection within the measurement region 12. As illustrated in FIG. 6, the first ultrasonic meter 28 includes a V-bounce beam path 77.

Referring also to FIGS. 22A and 22B, a third beam path type 78 is illustrated.

The third beam path type 78, also described as a "parallel paths" beam path 78 includes a pair of beam paths 78a, 78b. When viewed along the first axis 6, the first and second beam paths 78a, 78b are parallel and spaced apart. For example, parallel chords when the flow conduit 5 or through path 45 has a generally circular cross section. When viewed perpendicular to the first axis 6, the first beam path 78a has a similar shape to a transverse beam path 76, whereas the second beam path 78b has a similar shape to a V-bounce beam path 77 including a single reflection. The fourth configuration 53 uses an example of a parallel paths beam type 78.

Referring also to FIGS. 23A and 23B, a fourth beam path type 79 is illustrated.

The fourth beam path type 79, also described as a "three-chord" beam path 79 includes three distinct path segments 80a, 80b, 80c. A three-chord beam path 58a, 58b, 58c was briefly described hereinbefore in relation to the fifth configuration 56. When viewed along the first axis 6, the first, second and third path segments 80a, 80b, 80c form an equilateral triangle. When viewed perpendicular to the first axis 6, the first, second and third path segments 80a, 80b, 80c extend along the first axis 6. Overall, the shape of the three-chord beam path 79 is similar to a helix, and may also be described as a triangular helix shape.

Referring also to FIGS. 24A and 24B, a fifth beam path type 81 is illustrated.

The fifth beam path type 81, also described as a "multi-path" beam path 81 includes multiple distinct beam paths 81a, 81b, 81c, each of which bisects the flow conduit 5 and/or through passage 45. The multiple beam paths 81a, 81b, 81c are equi-angularly spaced when viewed along the first axis 6. When viewed perpendicular to the first axis 6, the multiple beam paths 81a, 81b, 81c may be of a V-bounce type as illustrated in FIG. 24B, or the multiple beam paths 81a, 81b, 81c may be of a transverse type, or a mixture of transverse and V-bounce.

An example of a three beam multi-path 9a, 9b, 9c has been described hereinbefore in relation to the first configuration 36. Similarly, the sixth configuration 59 uses a two-beam multi-path arrangement, and the eighth configuration 65 uses a four-beam multi-path arrangement.

Referring also to FIGS. 25A and 25B, a sixth beam path type 82 is illustrated.

The sixth beam path type 82, also described as a "W-bounce" beam path 82, has a transverse component bisecting the cross-section of the flow conduit 5 or through path 45 when viewed along the first axis 6. This is similar to the transverse or V-bounce beam paths. When viewed perpendicular to the first axis 6, a W-bounce beam path 82 includes three reflections within the measurement region 12.

A W-bounce beam path 82 may in generally be substituted in any example described hereinbefore or hereinafter which uses a transverse beam path 76 or a V-bounce beam path 77.

Referring also to FIGS. 26A and 26B, a seventh beam path type 83 is illustrated.

The seventh beam path type 83, also described as a "two chord" beam path 82, is similar to the three-chord beam path 79, except that it only includes a pair of chords. The second configuration 47 uses a two-chord beam path 49a, 49b.

The first to seventh beam path types 76, 77, 78, 79, 81, 82, 83 may be employed within any of the first to fourth ultrasonic meters 28, 35, 37, 43, given a suitable choice of protrusion 34 configuration 36, 47, 51, 53, 56, 59, 62, 65.

Common Features and Variations of the Protrusions

An ultrasonic meter 28, 35, 37, 43 may be used for measuring a rate of fluid flow and/or for metering a quantity of fluid which has passed through the ultrasonic meter 28, 35, 37, 43 in a particular time period. The fluid may be liquid or gas. Examples include water, potable water, waste water, drainage run-off water, petrol, oil, natural gas, and so forth. An ultrasonic meter 28, 35, 37, 43 may be used to meter a fluid for charging purposes.

In the examples described hereinbefore, each of the protrusions 34 extends along the first axis 6 for a distance which at least spans the measurement region 12. However, this is not essential, and in some examples one or more protrusions 34 may extend only part-way across the length d of the measurement region 12 (see FIG. 29).

In some examples, the protrusions 34 may start and end with the measurement region 12. In other words protrusions 34 may span only between the first position $z_1$ and the second position $z_2$. In other examples, the protrusions 34 may extend towards the first opening 7 (from $z<z_1$ to $z=z_2$), towards the second opening 8 (from $z=z_1$ to $z>z_2$), or towards both the first and second openings 7, 8 (from $z<z_1$ to $z>z_2$).

In the examples described hereinbefore, each of the protrusions 34 extends parallel to the first axis 6. However, this is not essential, and in some examples one or more protrusions 34 may extend along the first axis 6 without being parallel to the first axis 6 (see FIG. 31).

Unless stated otherwise, the beam path 9 may include one, two, three or more reflections. These reflections may be from internal surfaces of the flow conduit 5 and/or insert 44. Reflections may be from reflectors 46 attached to, or integrated with, the flow conduit 5 and/or insert 44. Reflectors 46 may take the form of metal plates.

For any given application, the flow conduit 5 should be defined using materials which are capable of withstanding the internal pressure and containing the fluid. The flow conduit 5 should be defined using materials which are chemically compatible with the fluid to be metered, whether inherently or as a result of surface modification treatments such as painting, anodising or other coating techniques.

Suitable materials for defining the flow conduit may include metals, in particular copper, steel or cast iron, or commonly used engineering plastics.

For any given application, the insert 44 should be formed from materials which are capable of defining protrusions which are able to withstand a pressure differential between the through passage 45 and an outer surface of the insert 44 (facing an inner surface of the flow conduit). The insert 44 should be formed from materials which are chemically compatible with the fluid to be metered, whether inherently or as a result of surface modification treatments such as painting, anodising or other coating techniques. Suitable materials for forming the insert may include metals, in particular copper, steel or cast iron, or commonly used engineering plastics such as, for example, polyether ether ketone (PEEK), polytetrafluoroethylene (PTFE), polyphenylene sulfide (PPS) and/or polyoxymethylene (acetal). Plastic materials may or may not be reinforced with glass fibres, carbon fibres and/or other reinforcement materials.

The height, cross-sectional area and/or cross-sectional along one or more protrusions 34 may vary with position along the first axis. For example, referring again to FIGS. 6 and 10, the protrusions may begin flush with the flow conduit 5 walls or insert 44, before increasing in height as the measurement region 12 is approached. The protrusions 34 may then maintain a constant height through the measurement region 12. In some examples it may be beneficial to have two or more positions along the first axis 6 at which one or more protrusions 34 have with maximal height and/or cross-sectional area, for example where there are more beam paths 9, and reduced height and/or cross-sectional area at other positions.

In some examples, a height of at least one protrusion 34 perpendicular to the first axis 6 increases in a direction +z along the first axis 6 from the first opening 7 to the first position $z_1$. The height of such a protrusion 34 may be zero at the first opening 7. In some examples, all of the protrusions 34 may be similarly configured.

In some examples, a height of at least one protrusion 34 perpendicular to the first axis 6 increases in a direction -z along the first axis 6 from the second opening 8 to the second position $z_2$. The height of such a protrusion 34 may be zero at the second opening 8. In some examples, all of the protrusions 34 may be similarly configured.

Figure 27:
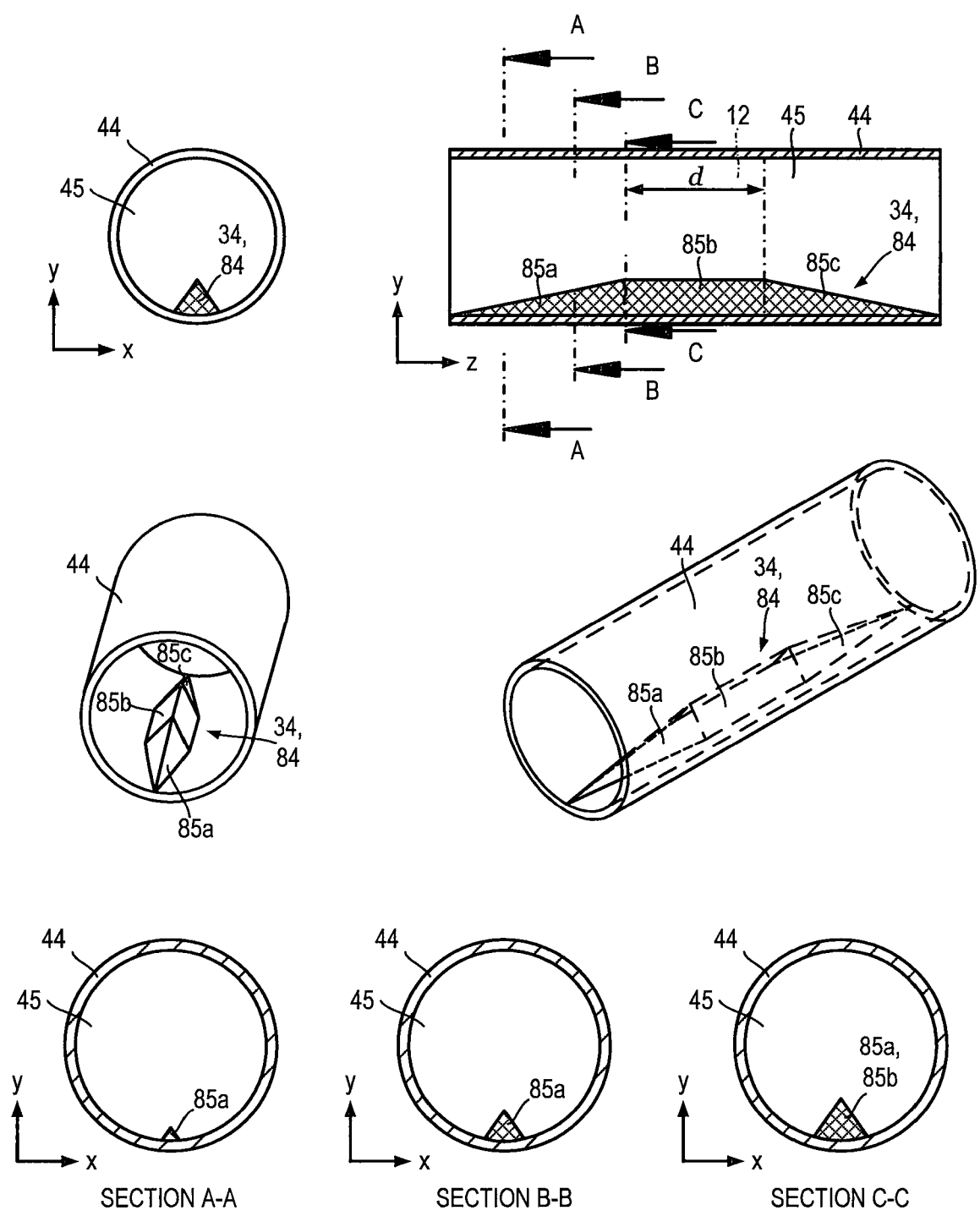
FIG. 27 includes schematic cross-sections, end-on views and projections which illustrate a protrusion for an ultrasonic meter having varying cross-sectional area.

Referring also to FIG. 27, an example is shown of a protrusion 84 having variable cross-sectional area along the first axis 6.

The cross-sectional area of the protrusion 84 varies with position along the first axis 6. In this example, the cross-sectional area changes, whilst the cross-sectional shape remains consistent. The protrusion 84 has three segments 85a, 85b, 85c. The cross-sectional area of the first segment 85a increases steadily between the first opening 7 and the measurement region 12 (first position $z_1$), as illustrated in the successive cross-sections A-A, B-B and C-C. The second segment 85b spans the measurement region 12 and has substantially constant cross-sectional area. The cross-sectional area of the third segment 85c decreases steadily between the measurement region 12 (second position $z_2$) and the second opening 8, mirroring the variation of the first segment 85a.

Only a single protrusion 84 is shown in FIG. 27 for visual clarity, however, any number of protrusions 84 may be used. The protrusion 84 is shown in the context of an insert 44, however, one or more protrusions 84 may be equally attached to, or formed as part of, a flow conduit 5.

Some or all of protrusions 34 of an ultrasonic meter 28, 35, 37, 43 may exhibit variations of cross-sectional area whilst maintaining a consistent cross-sectional shape, in a similar way to the protrusion 84.

Figure 28:
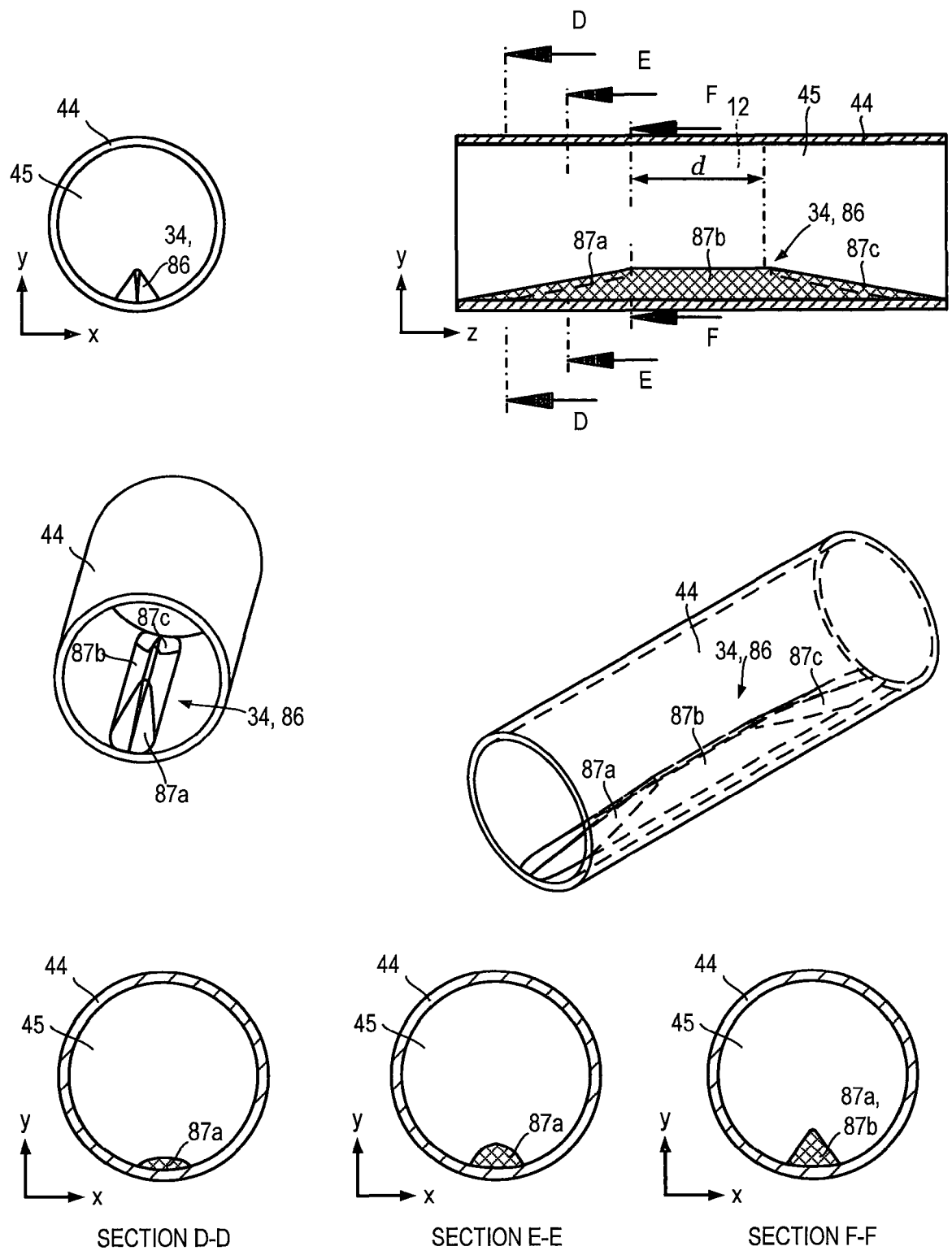
FIG. 28 includes schematic cross-sections, end-on views and projections which illustrate a protrusion for an ultrasonic meter having varying cross-sectional shape.

Referring also to FIG. 28, an example is shown of a protrusion 86 having variable cross-sectional shape along the first axis 6.

The cross-sectional shape of the protrusion 86 varies with position along the first axis 6. In this example, the cross-sectional area changes with the changes in the cross-sectional shape. In other examples, the cross-sectional shape may change whilst maintaining a substantially constant cross-section area. The protrusion 86 has three segments 87a, 87b, 87c. The cross-sectional shape of the first segment 87a gradually changes from a truncated ellipse towards a rounded triangular shape between the first opening 7 and the measurement region 12 (first position $z_1$), as illustrated in the successive cross-sections A-A, B-B and C-C. At the same time, the cross-sectional area of the first segment 87a also increases steadily. The second segment 87b spans the measurement region 12 and has substantially constant cross-sectional shape and cross-sectional area. The cross-sectional shape of the third segment 87c varies between the measurement region 12 (second position $z_2$) and the second opening 8, mirroring the variation of the first segment 87a. The cross-sectional area of the third segment 87c also decreases steadily towards the second opening.

Only a single protrusion 86 is shown in FIG. 28 for visual clarity, however, any number of protrusions 86 may be used. The protrusion 86 is shown in the context of an insert 44, however, one or more protrusions 86 may be equally attached to, or formed as part of, a flow conduit 5.

Some or all of protrusions 34 of an ultrasonic meter 28, 35, 37, 43 may exhibit variations of cross-sectional shape, in a similar way to the protrusion 86.

Examples have included protrusions 34 which are continuous across the measurement region 12, having consistent height, cross-sectional area and/or cross-sectional shape. However, this need not be the case.

Figure 29:
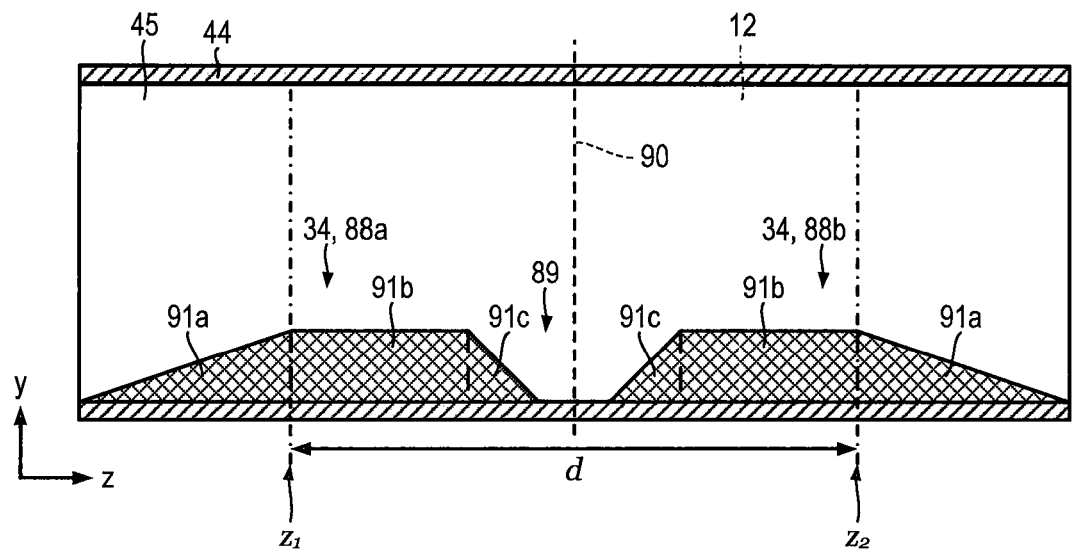
FIG. 29 is a schematic cross-section which illustrates a pair of sub-protrusions for an ultrasonic meter, separated by a gap.

For example, referring also to FIG. 29, a protrusion 34 may be separated into first and second sub-protrusions 88a, 88b, separated by a gap 89. Each sub-protrusion 88a, 88b may include an extended tapering segment 91a having varying height, cross-sectional area and/or cross-sectional shape. Each sub-protrusion 88a, 88b may include a middle segment 91b having substantially constant height, cross-sectional area and/or cross-sectional shape. Each sub-protrusion 88a, 88b may include a shortened tapering segment 91c having varying height, cross-sectional area and/or cross-sectional shape. The extended tapering segments 91a extend for a larger distance along the first axis 6 than the shortened tapering segments 91c. The sub-protrusions 88a, 88b are arranged symmetrically about a midpoint 90 of the measurement region 12.

Provided that the gap 89 is relatively short with respect to the intended flow rates, the gap 89 may have small or negligible impact on the fluid flow within the through passage 45. In this way, the sub-protrusions 88a, 88b may be effective to displace fluid into one or more beam paths 9. Forming an insert 44 as two parts for connection together may simplify manufacturing and reduce costs. Using one or more pairs of sub-protrusions 88a, 88b makes it easier to forming an insert as an assemblage of two parts, because the gap 89 may correspond to a location of the join between the parts. This may permit fabrication of an insert 44 to be simplified.

Only one pair of sub-protrusions 88a, 88b are shown in FIG. 29 for visual clarity, however, any number of pairs of sub-protrusions 88a, 88b may be used. The sub-protrusions 88a, 88b are shown in the context of an insert 44, however, one or more pairs of sub-protrusions 88a, 88b may be equally attached to, or formed as part of, a flow conduit 5.

Some or all of protrusions 34 of an ultrasonic meter 28, 35, 37, 43 may take the form of pairs of sub-protrusions 88a, 88b.

Ultrasonic meters have been described in which the protrusions 34 are symmetric about a midpoint 90 of the measurement region 12. Symmetry may be useful when the flow path 4 may be in either direction between the first and second openings 7, 8. However, when the flow path 4 is unidirectional, it may be advantageous to use asymmetric protrusions 34.

Figure 30:
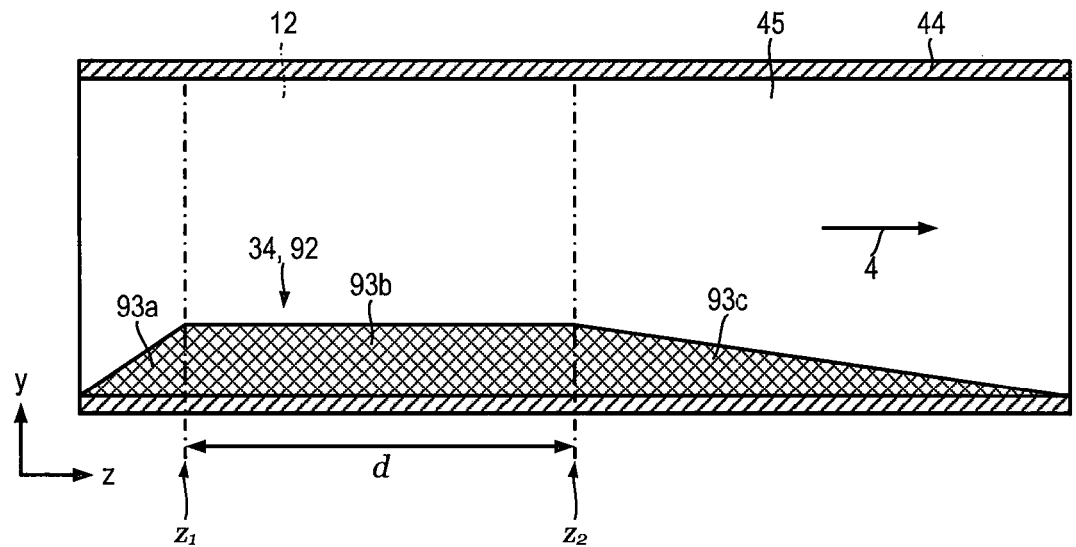
FIG. 30 is a schematic cross-section which illustrates an asymmetric protrusion for an ultrasonic meter.

For example, referring also to FIG. 30, an example of an insert 44 having an asymmetric protrusion 92 is shown.

The asymmetric protrusion 92 includes first, second and third segments 93a, 93b, 93c. The height, cross-sectional area and/or cross-sectional shape of the asymmetric protrusion 92 varies with position along the first axis 6. The height and/or cross-sectional area of the first segment 93a gradually increases between the first opening 7 and the measurement region 12 (first position $z_1$). The second segment 93b spans the measurement region 12 and has substantially constant height, cross-sectional shape and cross-sectional area. The height and/or cross-sectional area of the third segment 93c gradually decreases between the measurement region 12 (second position $z_2$) and the second opening 8. However, instead of mirroring the variation of the first segment 93a, the third segment 93c spans a larger distance along the first axis 6, z.

When the flow path 4 is expected to be unidirectional, for example from the first opening 7 towards the second opening 8, use of asymmetric protrusions 92 may reduce a pressure drop across the ultrasonic meter 28, 35, 37, 43, compared to symmetric protrusions of similar height, cross-sectional area and cross-sectional shape.

Only a single asymmetric protrusion 92 is shown in FIG. 30 for visual clarity, however, any number of asymmetric protrusions 92 may be used. The asymmetric protrusion 92 is shown in the context of an insert 44. However, one or more asymmetric protrusions 92 may be equally attached to, or formed as part of, a flow conduit 5.

When the flow path 4 is unidirectional, some or all of protrusions 34 of an ultrasonic meter 28, 35, 37, 43 may be asymmetric protrusions 92.

In FIG. 30, the measurement region 12 is shown closer to the first opening 7 than the second opening 8. However, this is merely result of the way that FIG. 30 is drawn, and is not a required feature.

Helical Protrusions

Fluid flowing along a pipe may exhibit a flow disturbance sometimes termed "swirl", in which fluid away from a centre of a flow conduit 5 follows a helical path along and about the first axis 6. Swirl is often found downstream of pumps. For some types of beam path type, swirl can be a particular issue. For example, clockwise swirl about the first axis 6 may cause an ultrasonic meter 1, 21 to overestimate a flow rate, whereas anticlockwise swirl about the first axis 6 may cause an ultrasonic meter 1, 21 to underestimate a flow rate.

Figure 31:
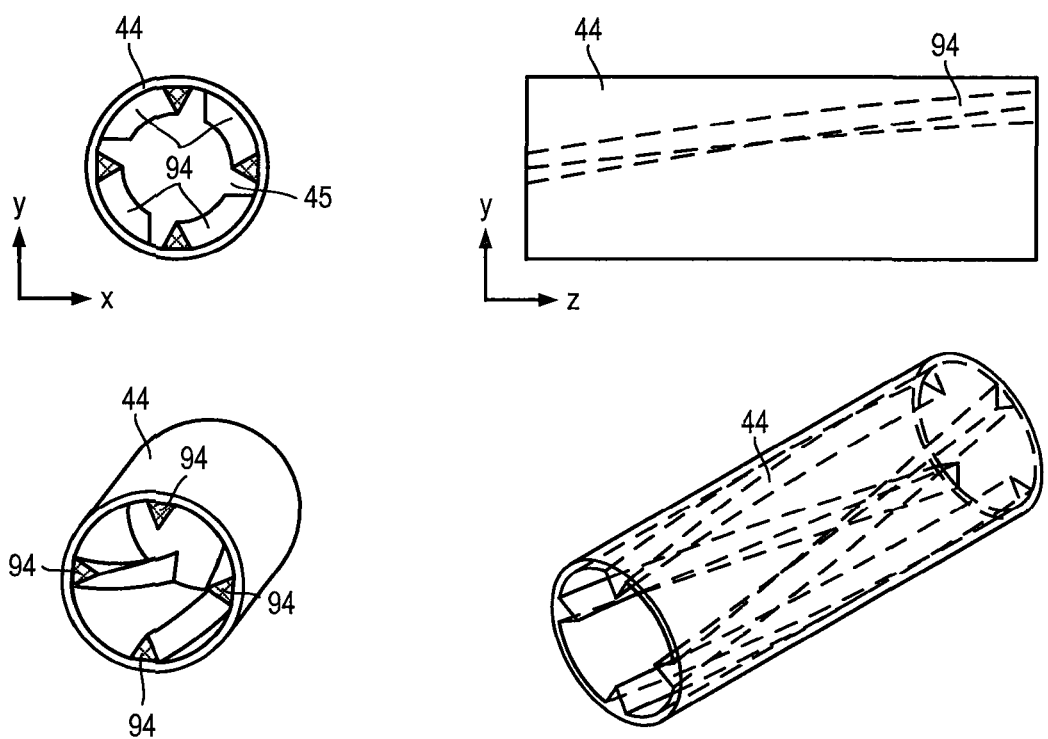
FIG. 31 includes a schematic cross-section, an end-on view and projections which illustrate helical protrusions for an ultrasonic meter.
Figure 32:
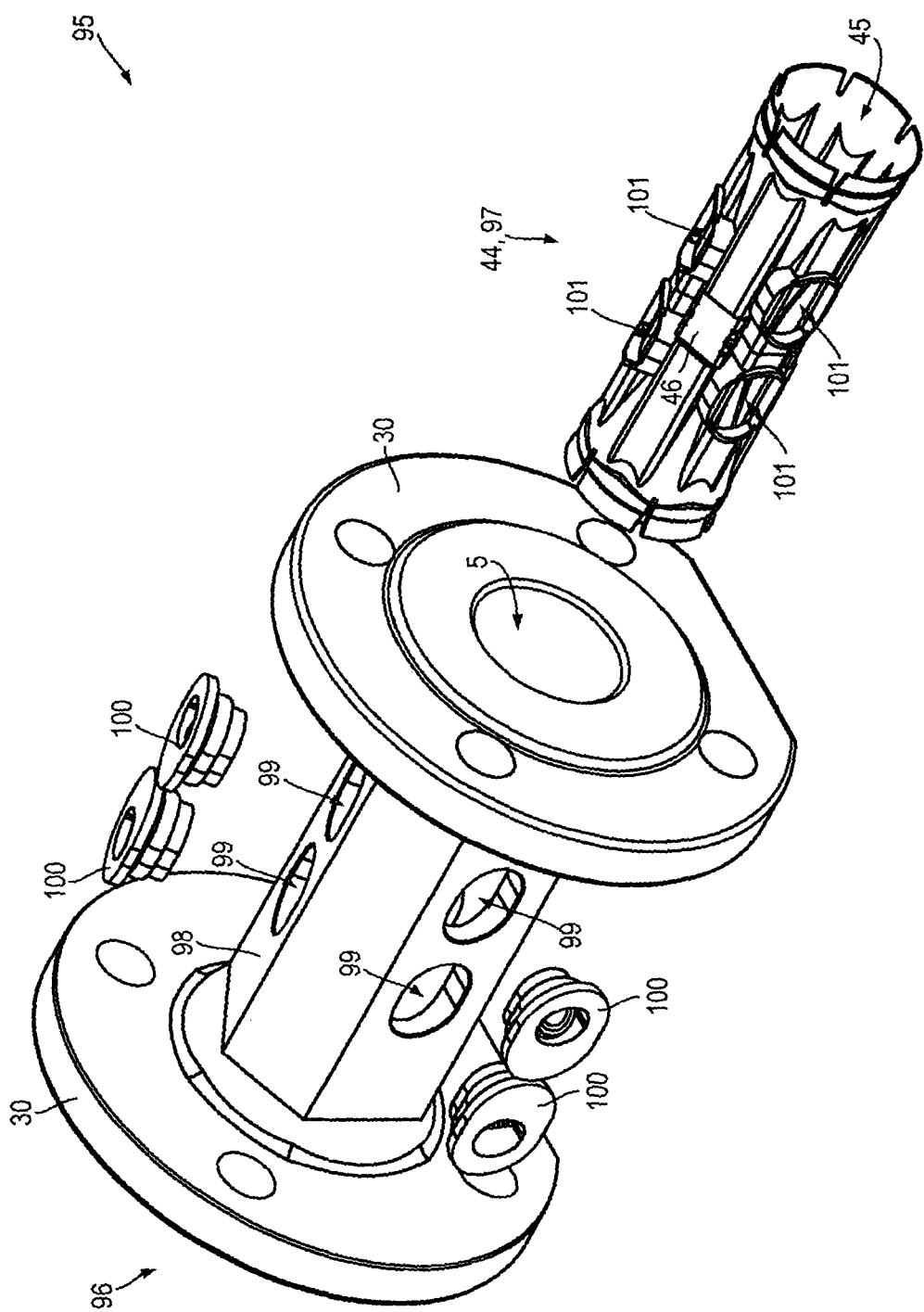
FIGS. 32 to 37 include schematic cross-sections, end-on views and projections which illustrate a fifth ultrasonic meter.
Figure 33:
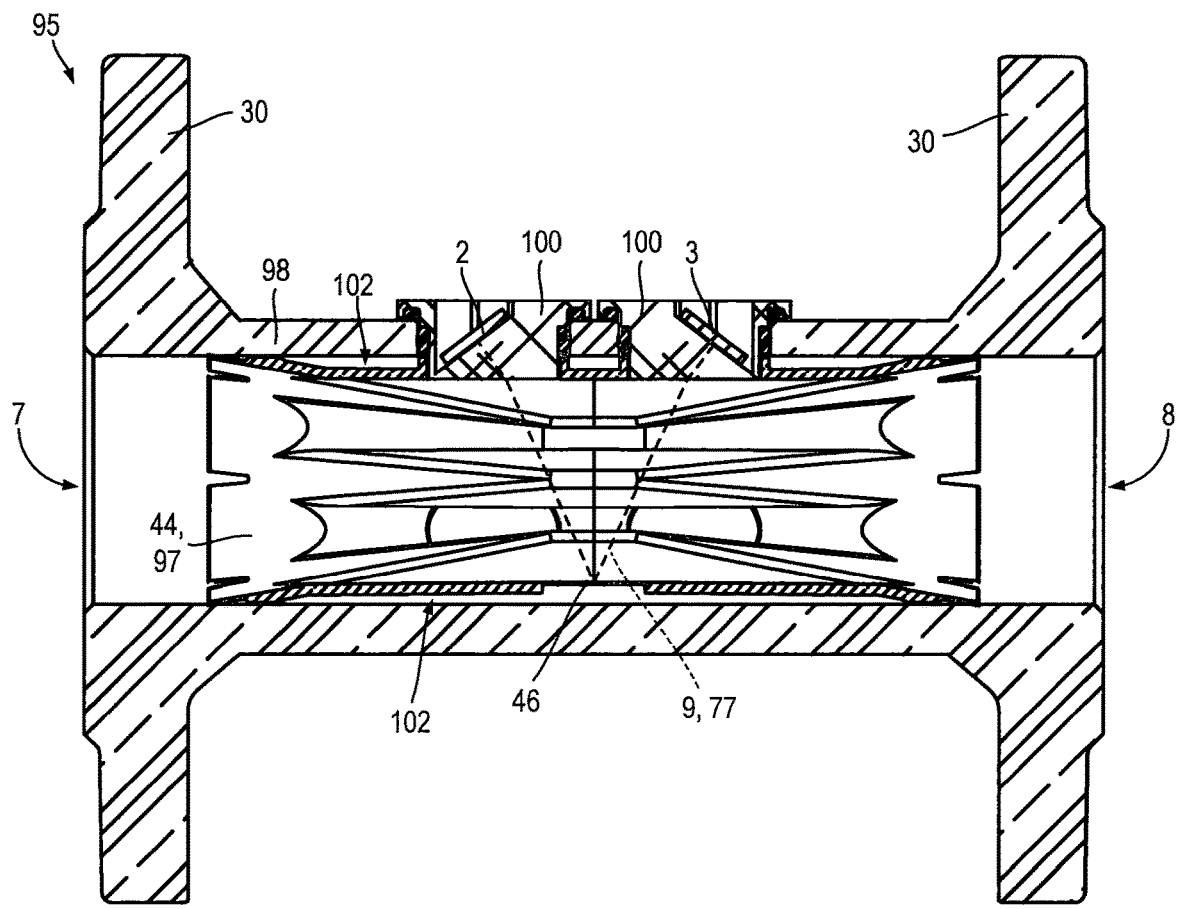
Figure 34:
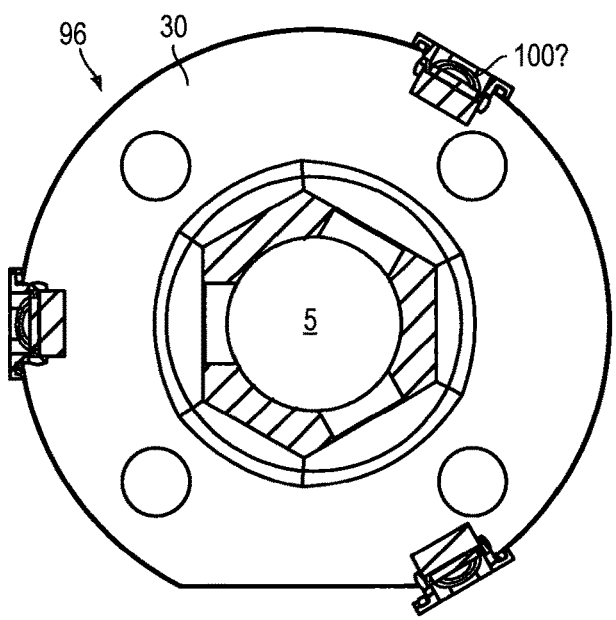
Figure 35:
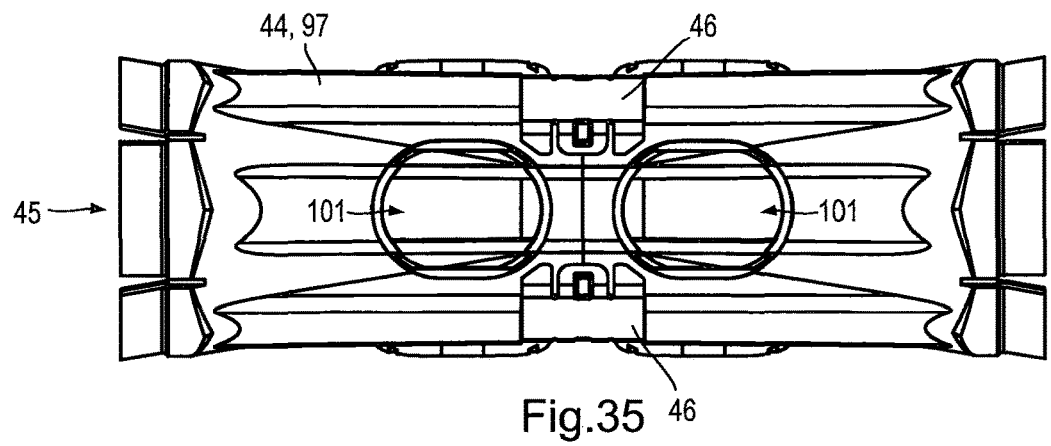
Figure 36:
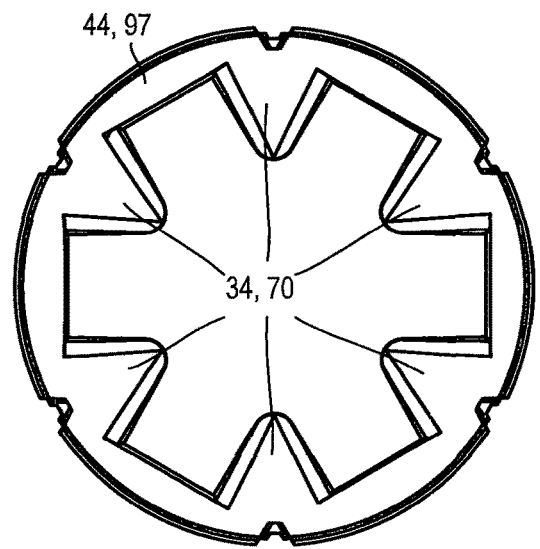
Figure 37:
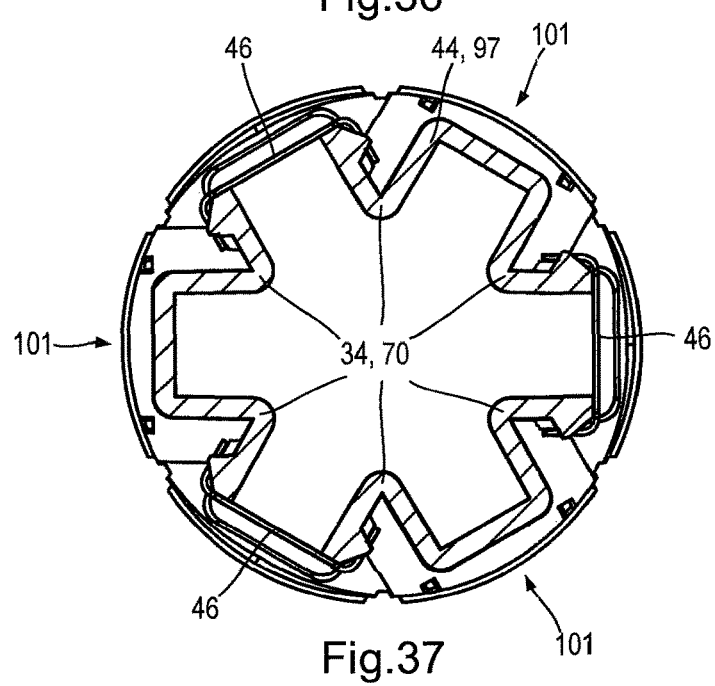

Referring also to FIG. 31, an example of an insert 44 including helical protrusions 94 is shown.

The insert 44 including helical protrusions 94 may be used with an ultrasonic meter 28, 35, 37, 43. The helical protrusions 94 may provide different effects depending on the relative sense of rotation of swirl in a flow and the helical protrusions 94. If a flow includes swirl in an opposite sense to the helical protrusions 94, then the helical protrusions 94 may reduce the magnitude of the swirl. Alternatively, if a flow includes swirl in the same sense as the helical protrusions 94, then the helical protrusions 94 may cause the swirl to be more controlled and/or consistent. Increasing the consistency of swirl may improve the ease and reliability of correcting or calibrating for the effects of swirl.

The helical protrusions 94 also act to displace an increased fraction of the fluid into the three-chord beam path 79.

The helical protrusions 94 have been shown in the context of an insert 44, however, one or more helical protrusions 94 may be equally attached to, or formed as part of, a flow conduit 5.

Fifth Ultrasonic Meter

Referring also to FIGS. 32 to 37, a fifth ultrasonic flow meter 95 is shown.

The fifth ultrasonic flow meter 95 is similar to the fourth ultrasonic meter 43, and includes corresponding features, as well as additional features described hereinafter.

The fifth ultrasonic flow meter 95 includes a pipe section 96 and an insert 97. The pipe section 96 includes a central section 98 having a cylindrical bore defining the flow conduit 5. The central section 98 is straight, and extends along the first axis 6 between a pair of flanges 30 for use when installing the fifth ultrasonic flow meter between first and second pipes 31, 32. Three pairs of first through holes 99 are formed through the central section 98, each pair spaced at angular intervals of 120 degrees about the first axis 6. The first through holes 99 are for receiving ultrasonic inserts 100, each of which includes an ultrasonic transducer 2, 3. The pipe section 96 is formed from cast iron. Possible alternative materials for the pipe section include ductile iron, brass, stainless steel, aluminium or plastics.

The insert 97 is secured inside the pipe section 96. In this example, the insert 97 includes second through holes 101 corresponding to the first through holes 99. The insert 97 is placed inside the pipe section 96 so that the first and second through holes 99, 101 are aligned. An ultrasonic insert 100 is then received into each set of aligned first and second through holes 99, ii. The ultrasonic inserts 100 secure the insert 97 within the pipe section 96. The insert is formed from plastic, for example, by injection molding or 3D-printing.

Once assembled, each pairing of ultrasonic inserts 100 defines a V-bounce beam path 9, 77, including a reflection from a reflector 46 clipped to the exterior of the insert 96 opposite to the corresponding second through holes 101. The reflectors 46 are metal plates. The fifth ultrasonic meter 5 uses the first configuration 36, with six rounded triangular protrusions 70.

The insert 97 is shaped to provide a secondary flow path 102 outside the through-passage, in this example between the insert 97 and the walls of the flow conduit 5 defined by the central section 98. The secondary flow path 102 is sized so that a first mass fraction $f_1$ of fluid passing via the through passage 45 of the insert 96 is much greater than a second mass fraction $f_2$ of fluid passing via the secondary flow path 102, i.e. $f_1 \gg f_2$. For example, $f_2 \leq 0.01$ with $f_1 = 1 - f_2$. With the secondary flow path 102, the protrusions 34 may exclude only part of the corresponding non-sampled volumes 12b. However, due to the continuity of the internal surfaces of the insert 44, 97, the protrusions 34 may be essentially as effective as solid protrusions in displacing fluid flow into the beam paths 9.

The secondary flow path 102 may prevent fluid from stagnating in the space between the insert 97 and an inner surface of the flow conduit 5 defined by the central section 98. In use, a pressure differential may develop between the through passage 45 of an insert 44, 97 and a space between the insert 44, 97 and an inner surface of the flow conduit 5. The secondary flow path 102 of the insert 97 may also serve to relieve such a pressure differential on the portions of the insert 97 which define the protrusions 34, 70. Reducing the pressure differential may enable the insert 97 to be made using cheaper plastic materials and/or using cheaper fabrication techniques such as 3D-printing. In particular for smaller batches of inserts 44, 3D printing would be expected to be more cost effective than optimising and fabricating molds for injection molding.

In an alternative implementation of the fifth ultrasonic meter 95, the insert 97 may be omitted and the protrusions 34, 70 may instead be integrally formed with the central section 98. In other implementations, the reflectors 46 may be omitted, and the reflection in each V-bounce beam path 9, 77 may be provided by an internal reflection from the insert 97 or central section 98. Internal reflection may be realised through appropriate selection of the materials of the insert 97 or central section 98, in combination with the angle of the V-bounce beam paths 9, 77. Use of the first configuration 36 is not essential, and the fifth ultrasonic meter 95 may be adapted to used other configurations of protrusions 34 and beam paths 9, for example any of the second to eighth configurations 47, 51, 53, 56, 59, 62, 65.

Modifications

It will be appreciated that many modifications may be made to the embodiments hereinbefore described. Such modifications may involve equivalent and other features which are already known in the design and use of ultrasonic meters, and which may be used instead of, or in addition to, features already described herein. Features of one embodiment may be replaced or supplemented by features of another embodiment.

In the general case, protrusions 34 may be designed according to a relatively simple method. A number of pairs of ultrasonic transducers 2, 3 and the corresponding beam path 9 shapes are selected for a given flow conduit 5. The flow conduit 5 boundaries and the beam paths 9 including effective widths $w_b$ may then be projected into a single plane perpendicular to the first axis 6. Any area within the projection of the flow conduit 5 which is not within the projection of any beam path 9 represents at least part of a non-sampled volume 12b. Non-sampled volumes 12b which are also bordering a perimeter of the flow conduit 5 may be used as the basis for cross-sections of prismatic protrusions 34 running at least the length of the measurement region 12. Further optimisation may be performed using fluid modelling software, for example to determine precise cross-sectional shapes and/or variations in height, cross-sectional area and/or cross-sectional shape along the first axis 6.

Examples have illustrated protrusions 34 which are generally spaced in equi-angular configurations about the first axis 6. However, configurations of protrusions 34 need not be equi-angular about the first axis 6, as this is not necessary in order to displace fluid through the one or more beam paths 9.

It may be observed that the mass of fluid directed between each pair of protrusions will be roughly equal for equi-angular spaced configurations, for example the first configuration 36. Given this, the ultrasonic meter 28, 35, 37, 43, 95 may be simplified by using only a single beam path 9, then extrapolating to the remaining volume between the other protrusions (the central portion is also sampled). This calculation should still be more reliable than assuming a flow speed profile 22, as it merely depends on the relative area fractions. The correction may be calibrated using known flow rates of fluid, and would not be expected to be significantly sensitive to flow disturbances in an installed location because of the action of the protrusions.

Method of Retro-Fitting a Conventional Ultrasonic Meter

Existing ultrasonic meters 1, 21 may be retrofitted with appropriate inserts 44 which may reduce sensitivity to flow disturbances.

In particular, a method of retro-fitting may include securing an insert 44 within a flow conduit 5 so that at least part of the insert 44 is disposed within the measurement region 12. The insert 44 should have a configuration of protrusions 34, and should be positioned and rotated so as to position each protrusion 34 to exclude fluid flow from at least part of one or more non-sampled volumes 12b. In this way, the insert 44 may act to displace fluid flow into the beam paths 9 of the existing ultrasonic meter 1, 21. Inserts 44 may be produced for any existing ultrasonic meter 1, 21 having a known or measurable geometry of beam paths 9 and corresponding non-sampled volumes 12b.

Figure 38:
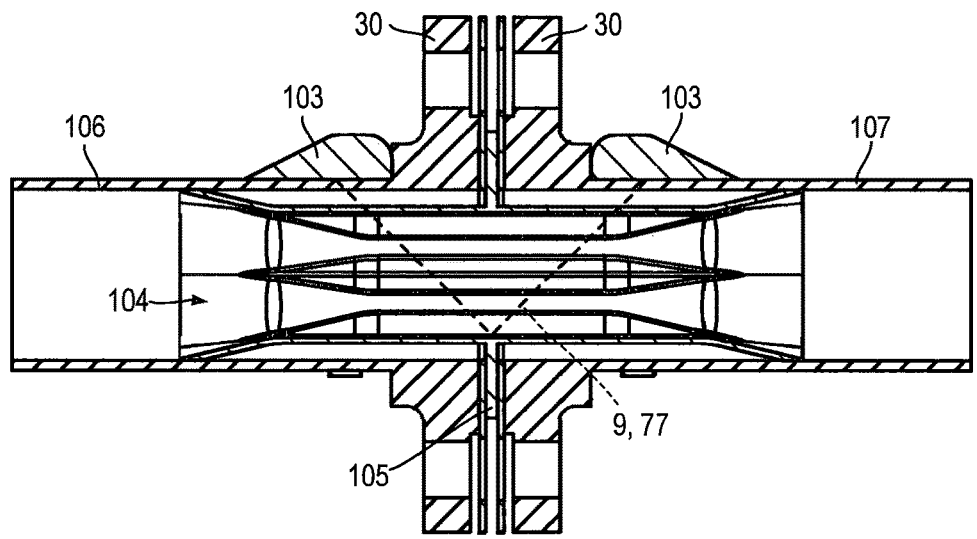
FIGS. 38 to 40 include schematic cross-sections and a projection which illustrate a method of retrofitting an ultrasonic meter using an insert defining protrusions.
Figure 39:
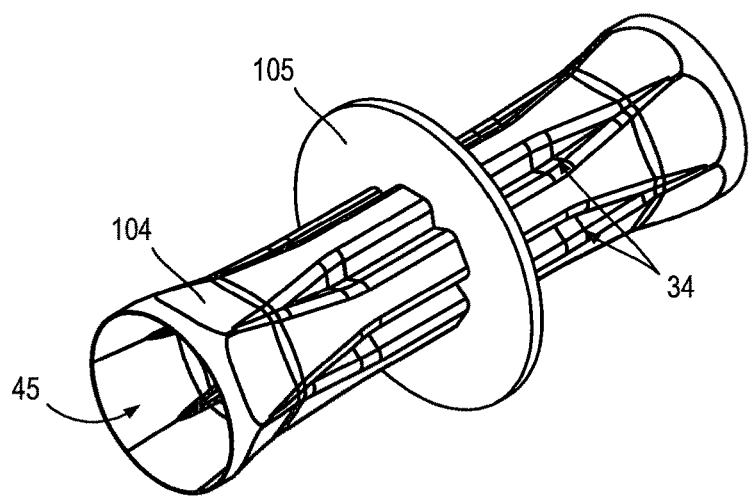
Figure 40:
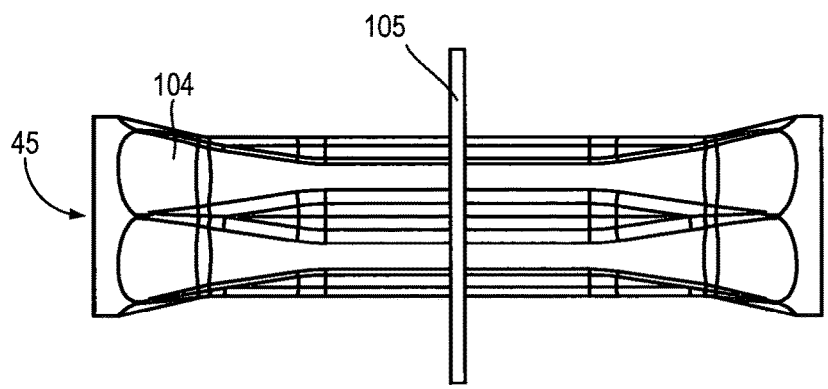

Referring also to FIGS. 38 to 40, one example of retrofitting is illustrated.

Clamp-on ultrasonic transducers 103 may be attached at positions spaced along a pipe to measure a flow within the pipe. A retrofitting insert 104 having a gasket plate 105 extending radially outwards from a midpoint of the insert 104 may be used in combination with clamp-on ultrasonic transducers 103.

A first half of the insert 104 is received into the bore of a first pipe 106 terminated by a flange 30. A second pipe 107 is then positioned with the bore receiving the other half of the insert 104, and a flange 30 of the second pipe 107 abutting the gasket plate 105. Bolts (not shown in FIG. 38) are used to clamp the first and second pipes 106, 107 together. The gasket plate 105 serves both to secure the insert 104 in place, and to provide a fluid-tight seal between the first and second pipes 106, 107. The clamp-on ultrasonic transducers 103 are attached to either side of the joint, to define a V-bounce beam path 9, 77, across the joint between the first and second pipes 106, 107. The reflection of the beam path 9, 77 may be from a reflector 46 attached to, or integrated with the insert 104. Alternatively, the reflection of the beam path 9, 77 may be from an internal surface of the insert 104.

Thus, the clamp-on ultrasonic transducers 103 may be provided with reduced sensitivity to flow disturbances by using the insert 104. A calculation conducted based on average speed u* measurements performed by a pair of clamp-on ultrasonic transducers 103 may require re-calibration. Additionally, the insert 104 enables making a measurement across the joint between the first and second pipes 106, 107, which would not be possible without the insert 104 providing a clean reflection. A measurement across a joint between two existing pipes 106, 107 may have the advantage of being minimally invasive.

In an alternative arrangement (not shown) the gasket plate 105 may be located at any point along the first axis 6 of the insert 104 including, for example, at one extreme end of the insert 104. In another alternative arrangement the gasket plate 105 may be omitted from the insert 104, and the insert 104 may instead be secured within a flow conduit 5 using alternative means such as adhesives, press fit (also referred to as "interference fit" or "press fit"), friction generated by resilient components such as "O" rings, screws and/or clamps, which may not require any modifications to the pipe(s) 106, 107.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

The invention claimed is:

1. An ultrasonic meter for measuring a flow-rate of a fluid, comprising:
a flow conduit for the fluid, the flow conduit extending along a first axis between a first opening and a second opening;
one or more pairs of ultrasonic transducers, each pair of ultrasonic transducers configured to define a corresponding beam path intersecting the flow conduit within a measurement region of the flow conduit, wherein each beam path makes an angle with the first axis so that within the measurement region each beam path comprises a component parallel to the first axis and a component transverse to the first axis, the measurement region spanning between a first position and a second position spaced apart along the first axis, wherein one or more portions of the measurement region which are outside of any of the one or more beam paths comprise non-sampled volumes;
two or more protrusions extending parallel to the first axis, at least part of each protrusion being arranged to re-direct fluid from at least part of one or more non-sampled volumes and through at least part of one or more sampled volumes, wherein the two or more protrusions are arranged so that, for each beam path, the component transverse to the first axis passes through at least one space defined by a pair of protrusions;
wherein the flow conduit is configured such that an average flow vector of fluid passing through the flow conduit remains within ±10 degrees of the first axis throughout the measurement region, wherein the average flow vector is calculated for each point along the first axis by averaging a vector field corresponding to the fluid velocity across a cross-section of the flow conduit perpendicular to the first axis.

2. An ultrasonic meter according to claim 1, wherein at least one protrusion extends along the first axis for a distance which spans the measurement region.

3. An ultrasonic meter according to claim 1, wherein for at least one protrusion, a cross-sectional area of the protrusion perpendicular to the first axis varies with position along the first axis.

4. An ultrasonic meter according to claim 1, wherein for at least one protrusion, a cross-sectional shape of the protrusion in a plane perpendicular to the first axis varies with position along the first axis.

5. An ultrasonic meter according to claim 1, wherein for at least one protrusion, a height of the protrusion perpendicular to the first axis varies with position along the first axis.

6. An ultrasonic meter according to claim 1, wherein at least one protrusion is symmetric about a midpoint of the measurement region.

7. An ultrasonic meter according to claim 1, wherein at least one protrusion is asymmetric about a midpoint of the measurement region.

8. An ultrasonic meter according to claim 1, wherein the two or more protrusions are integrally formed with the flow conduit.

9. An ultrasonic meter according to claim 1, wherein an insert is secured within the flow conduit, and wherein the insert at least partly defines a through passage comprising at least one of the two or more protrusions.

10. An ultrasonic meter according to claim 9, wherein the insert is configured to provide a secondary flow path between the insert and the walls of the flow conduit, the secondary flow path configured such that, in use, a first mass fraction of fluid passing via the through passage is greater than a second mass fraction of fluid passing via the secondary flow path.

11. An ultrasonic meter according to claim 1, wherein at least one beam path comprises at least one reflection.

12. An ultrasonic meter according to claim 1, wherein for at least one protrusion, a cross-sectional area of the protrusion in a plane perpendicular to the first axis increases moving in a direction along the first axis from the first opening to the first position and/or from the second opening to the second position.

13. An ultrasonic meter according to claim 1, wherein for each pair of ultrasonic transducers of the one or more pairs of ultrasonic transducers, an effective beam width of the corresponding beam path is substantially equal to a spacing of a pair of protrusions defining a space through which the component of the corresponding beam path transverse to the first axis passes.

14. Use of an ultrasonic meter according to claim 1 for metering flow of a fluid.

15. Use according to claim 14, wherein the fluid is water.

16. Use according to claim 14, wherein the fluid is natural gas.

17. An insert for an ultrasonic flow meter, the meter comprising:
   a flow conduit for the fluid, the flow conduit extending along a first axis between a first opening and a second opening;
   one or more pairs of ultrasonic transducers, each pair of ultrasonic transducers configured to define a corresponding beam path intersecting the flow conduit within a measurement region of the flow conduit, wherein each beam path makes an angle with the first axis so that within the measurement region each beam path comprises a component parallel to the first axis and a component transverse to the first axis, the measurement region spanning between a first position and a second position spaced apart along the first axis, wherein one or more portions of the measurement region which are outside of any of the one or more beam paths comprise non-sampled volumes;
   wherein the insert is configured to be securable within the flow conduit so that at least part of the insert is disposed within the measurement region, the insert comprising:
   a through passage, configured to extend along the first axis when the insert is secured within the flow conduit; and
   two or more protrusions extending into the through passage, such that when the insert is secured within the flow conduit, each protrusion extends parallel to the first axis so that at least part of each protrusion is arranged to re-direct fluid from at least part of one or more non-sampled volumes and through at least part of one or more sampled volumes, wherein the two or more protrusions are arranged so that, for each beam path, the component transverse to the first axis passes through at least one space defined by a pair of protrusions;
   wherein the flow conduit is configured such that an average flow vector of fluid passing through the flow conduit remains within ±10 degrees of the first axis throughout the measurement region, wherein the average flow vector is calculated for each point along the first axis by averaging a vector field corresponding to the fluid velocity across a cross-section of the flow conduit perpendicular to the first axis.

18. An insert according to claim 17, wherein at least one protrusion extends along the first axis for a distance which spans the measurement region.

19. An insert according to claim 17, wherein for at least one protrusion, a cross-sectional area of the protrusion perpendicular to the first axis varies with position along the first axis.

20. An insert according to claim 17, wherein for at least one protrusion, a height of the protrusion perpendicular to the first axis varies with position along the first axis.

* * * * *